United States Patent [19]
Iida

[11] Patent Number: 5,258,973
[45] Date of Patent: Nov. 2, 1993

[54] METHOD OF PRE-PROCESSING OVER-WRITE CAPABLE MAGNETOOPTICAL RECORDING MEDIUM, AND PRE-PROCESSED OVER-WRITE CAPABLE MAGNETOOPTICAL RECORDING MEDIUM

[75] Inventor: Haruhisa Iida, Tokyo, Japan

[73] Assignee: Nikon Corporation, Tokyo, Japan

[21] Appl. No.: 688,596

[22] PCT Filed: Oct. 31, 1990

[86] PCT No.: PCT/JP90/01396
§ 371 Date: Jun. 26, 1991
§ 102(e) Date: Jun. 26, 1991

[87] PCT Pub. No.: WO91/06951
PCT Pub. Date: May 16, 1991

[30] Foreign Application Priority Data
Nov. 1, 1989 [JP] Japan .................. 1-285537

[51] Int. Cl.⁵ .............................. G11B 11/10
[52] U.S. Cl. ................... 369/275.2; 369/13; 369/59; 369/110; 369/121; 369/275.3; 360/131; 360/135
[58] Field of Search .......... 369/13, 59, 63, 76, 369/116, 110, 121, 275.1, 275.3, 275.2; 360/131, 135

[56] References Cited

U.S. PATENT DOCUMENTS

| | | | |
|---|---|---|---|
| 4,910,622 | 3/1990 | Saito et al. | 369/13 |
| 5,014,254 | 5/1991 | Van Rosmalen et al. | 369/13 |
| 5,106,704 | 4/1992 | Matsumoto | 369/13 |
| 5,128,910 | 7/1992 | Iida | 369/13 |

FOREIGN PATENT DOCUMENTS

| | | |
|---|---|---|
| 0257530 | 3/1988 | European Pat. Off. |
| 62-102449 | 5/1987 | Japan |
| 63-152045 | 6/1988 | Japan |
| 63-244342 | 10/1988 | Japan |
| 63-291235 | 11/1988 | Japan |
| 1-107349 | 4/1989 | Japan |

OTHER PUBLICATIONS

"The Bell System Technical Journal", vol. 62 (Sep., 1983), pp. 1923–1936.

Primary Examiner—Paul M. Dzierzynski
Assistant Examiner—Kim-Kwok Chu
Attorney, Agent, or Firm—Shapiro and Shapiro

[57] ABSTRACT

An over-write capable magnetooptical recording medium is pre-processed by subjecting a track separation zone to a pre-processing field which aligns the magnetization of a recording layer in a predetermined direction so as to avoid formation, in the separation zone, of a magnetic wall between the recording layer and a reference layer when the reference layer is subjected to an initial field to align its direction of magnetization.

11 Claims, 22 Drawing Sheets

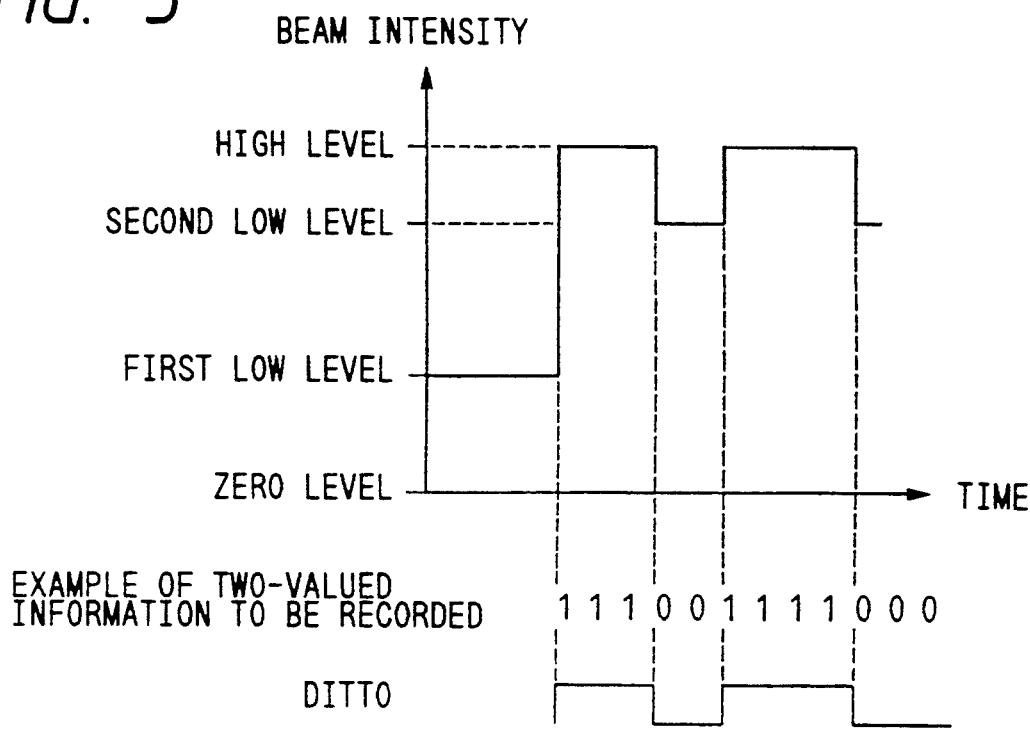
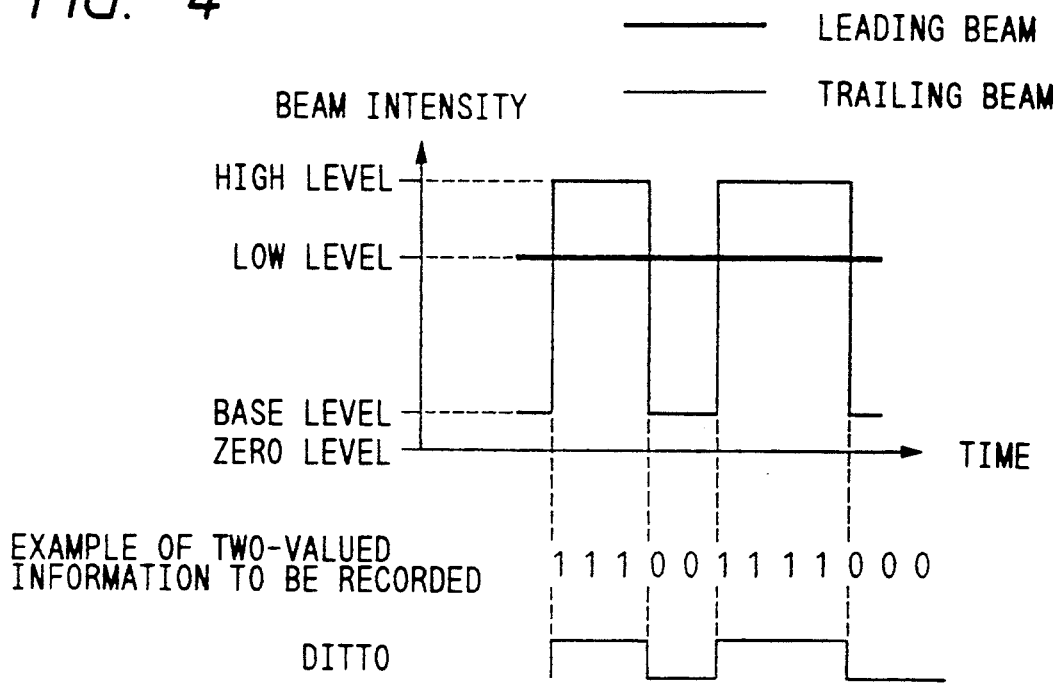

| FIRST LAYER: RECORDING LAYER |
|---|
| SECOND LAYER: REFERENCE LAYER |

| FIRST LAYER | ⇧ ⇩ ⇩ ⇧ ⇩ ⇧ ⇩ ⇩ * |
|---|---|
| SECOND LAYER | ⇧ ⇧ ⇧ ⇧ ⇧ ⇧ ⇧ ⇧ |

METHOD OF PRE-PROCESSING OVER-WRITE CAPABLE MAGNETOOPTICAL RECORDING MEDIUM, AND PRE-PROCESSED OVER-WRITE CAPABLE MAGNETOOPTICAL RECORDING MEDIUM

TECHNICAL FIELD

The present invention relates to a method of pre-processing a magnetooptical recording medium disk capable of performing an over-write operation by only intensity modulation of light without modulating a direction of a bias field, and the pre-processed disk.

BACKGROUND ART

In recent years, many efforts have been made to develop an optical recording/reproduction method, apparatus and medium which can satisfy various requirements including high density, large capacity, high access speed, and high recording/reproduction speed.

Of various optical recording/reproduction methods, the magnetooptical recording/reproduction method is most attractive due to its unique advantages in that information can be erased after it is used, and new information can be recorded.

A recording medium used in the magnetooptical recording/reproduction method has a perpendicular magnetic anisotropy layer or layers as a recording layer. The magnetic layer comprises, for example, amorphous GdFe GdCo, GdFeCo, TbFe, TbCo, TbFeCo, and the like. Concentrical or spiral tracks are normally formed on the recording layer, and information is recorded on the tracks. In this specification, one of the "upward" and "downward" directions of the magnetization with respect to a film surface is defined as an "A direction", and the other one is defined as a "non-A direction". Information to be recorded is binarized in advance, and is recorded by two signals, i.e., a bit ($B_1$) having an "A-directed" magnetization, and a bit ($B_0$) having a "non-A-directed" magnetization. These bits $B_1$ and $B_0$ correspond to "1" and "0" levels of a digital signal. The direction of magnetization of the recording tracks can be aligned in the "non-A direction" by applying a strong bias field. This processing is called "initialization". Thereafter, a bit ($B_1$) having an "A-directed" magnetization is formed on the tracks.

The principle of bit formation will be described below with reference to FIG. 1.

In the bit formation, a characteristic feature of laser, i.e., excellent coherence in space and time, is effectively used to focus a beam into a spot as small as the diffraction limit determined by the wavelength of the laser light. The focused light is radiated onto the track surface to write information by producing bits less than 1 μm in diameter on the recording layer. In the optical recording, a recording density up to $10^8$ bit/cm$^2$ can be theoretically attained, since a laser beam can be concentrated into a spot with a size as small as its wavelength.

As shown in FIG. 1, in the magnetooptical recording, a laser beam L is focused onto a recording layer 1 to heat it, while a bias field Hb is externally applied to the heated portion in the direction opposite to the initialized direction. A coercivity (denoted Hc herein) of the locally heated portion is decreased below the bias field Hb. As a result, the direction of magnetization of that portion is aligned in the direction of the bias field Hb. In this way, reversely magnetized bits are formed.

Ferromagnetic and ferrimagnetic materials differ in the temperature dependencies of the magnetization and Hc. Ferromagnetic materials have Hc which decreases around the Curie temperature and allow information recording based on this phenomenon. Thus, information recording in ferromagnetic materials is referred to as Tc recording (Curie temperature recording).

On the other hand, ferrimagnetic materials have a compensation temperature, below the Curie temperature, at which magnetization M becomes zero. The Hc abruptly increases around this temperature and hence abruptly decreases outside this temperature. The decreased Hc is canceled by a relatively weak bias field Hb. Namely, recording is enabled. This process is called $T_{comp.}$ recording (compensation point recording).

In this case, however, there is no need to adhere to the Curie point or temperatures thereabound, and the compensation temperature In other words, if a bias field Hb capable of canceling a decreased Hc is applied to a magnetic material having the decreased Hc at a predetermined temperature higher than a room temperature, recording is enabled.

The principle of reproduction will be described below with reference to FIG. 2.

FIG. 2 illustrates the principle of information reproduction based on the magnetooptical effect. Light is an electromagnetic wave with an electromagnetic-field vector normally emanating in all directions in a plane perpendicular to the light path. When light is converted to linearly polarized beams $L_P$ and radiated onto a recording layer 1, it is reflected by the surface or passes through the recording layer 1. At this time, the plane of polarization rotates according to the direction of magnetization (M). This phenomenon is called the magnetic Kerr effect or magnetic Faraday effect.

For example, if the plane of polarization of the reflected light rotates through $\theta_k$ degrees for the "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by "non-A-direction" magnetized bit $B_0$ cannot pass through the analyzer. On the contrary, a product of $(\sin 2\theta_k)^2$ and the light reflected by a bit $B_1$ magnetized along the "A direction" passes through the analyzer and becomes incident on a detector (photoelectric conversion means). As a result, the bit $B_1$ magnetized along the "A direction" looks brighter than the bit $B_0$ magnetized along the "non-A direction", and the detector produces a stronger electrical signal for the bit $B_1$. The electrical signal from the detector is modulated in accordance with the recorded information, thus reproducing the information.

In order to re-use a recorded medium, (i) the medium must be re-initialized by an initializing device, or (ii) an erase head having the same arrangement as a recording head must be added to a recording apparatus, or (iii) as preliminary processing, recorded information must be erased using a recording apparatus or an erasing apparatus. Therefore, in the conventional magnetooptical recording method, it is impossible to perform an over-write operation, which can properly record new information regardless of the presence/absence of recorded information.

If the direction of a bias field Hb can be desirably modulated between the "A-direction" and "non-A direction", an over-write operation is possible. However, it is impossible to modulate the bias field Hb at high speed. For example, if the bias field Hb comprises a permanent magnet, the direction of the magnet must be mechanically reversed. However, it is impossible to reverse the direction of the magnet at high speed. Even when the bias field Hb comprises an electromagnet, it is also impossible to modulate the direction of a large-capacity current at high speed.

However, according to remarkable technical developments, a magnetooptical recording method capable of performing an over-write operation by modulating only an intensity of light to be radiated in accordance with binary information to be recorded without turning on/off the bias field Hb or without modulating the direction of the bias field Hb, an over-write capable magnetooptical recording medium used in this method, and an over-write capable recording apparatus used in this method were invented and filed as a patent application (U.S. Ser. No. 453,255 filed on Dec. 20, 1989). The basic invention disclosed in the above-mentioned patent application will be described below.

One of the characteristic features of the basic invention is to use a magnetooptical recording medium comprising a multilayered perpendicular magnetic anisotropy film having at least a two-layered structure including a recording layer (first layer) and a reference layer (second layer). Information is recorded in the first layer (in some cases, also in the second layer) by a bit having an "A-directed" magnetization, and a bit having a "non-A-directed" magnetization.

An over-write method according to the basic invention comprises:

(a) moving a recording medium;

(b) applying an initial field Hini. to align a direction of magnetization of only the second layer in the "A direction" while the direction of magnetization of the first layer is left unchanged before recording;

(c) radiating a laser beam on the medium;

(d) pulse-modulating the beam intensity i accordance with binary information to be recorded;

(e) applying a bias field to the radiated portion when the beam is radiated; and (f) forming one of a bit having the "A-directed" magnetization and a bit having the "non-A-directed" magnetization when the intensity of the pulse-modulated beam is at high level, and forming the other bit when the beam intensity is at low level.

When recording is performed, the basic invention employs, for example, an over-write capable magnetooptical recording apparatus comprising:

(a) means for moving a magnetooptical recording medium;

(b) initial field Hini. apply means;

(c) a laser beam source;

(d) means for pulse-modulating a beam intensity in accordance with binary information to be recorded to obtain high level that provides, to the medium, a temperature suitable for forming one of a bit having an "A-directed" magnetization and a bit having a "non-A-directed" magnetization, and to obtain low level that provides, to the medium, a temperature suitable for forming the other bit; and (e) bias field apply means which can be commonly used as the initial field apply means.

In the basic invention, a laser beam is pulse-modulated according to information to be recorded. This procedure itself has been performed in the conventional magnetooptical recording method, and a means for pulse-modulating the beam intensity on the basis of binary information to be recorded is a known means. For example, see "THE BELL SYSTEM TECHNICAL JOURNAL, Vol. 62 (1983), pp. 1923–1936 for further details. Therefore, the modulating means is available by partially modifying the conventional beam modulating means if required high and low levels of the beam intensity are given. Such a modification would be easy for those who are skilled in the art if high and low levels of the beam intensity are given Another characteristic feature of the basic invention lies in high and low levels of the beam intensity. More specifically, when the beam intensity is at high level, "A-directed" magnetization of a reference layer (second layer) is reversed to the "non-A direction" by means of a bias field (Hb), and a bit having the "non-A-directed" [or "A-directed"] magnetization is thus formed in a recording layer (first layer) by means of the "non-A-directed" magnetization of the second layer. When the beam intensity is at low level, a bit having the "A-directed" [or "non-A-directed"] magnetization is formed in the first layer by means of the "A-directed" magnetization of the second layer.

In this specification, if expressions ooo [or ΔΔΔ] appear, ooo outside the parentheses in the first expression corresponds to ooo in the subsequent expressions ooo [or ΔΔΔ], and vice versa.

As is well known, even if recording is not performed, a laser beam is often turned on at first low level in order to, for example, access a predetermined recording position on the medium. When the laser beam is also used for reproduction, the laser beam is often turned on at an intensity of the first low level. In this invention, the intensity of the laser beam may be set at this first low level. However, level for forming a bit is second low level higher than the first low level. Therefore, the output waveform of the laser beam of the basic invention is as shown in FIG. 3.

Although not described in the specification of the basic invention, a recording beam need not always be a single beam but may be two proximity beams in the basic invention. More specifically, a first beam may be used as a low-level laser beam (erasing beam) which is not modulated in principle, and a second beam may be used as a high-level laser beam (writing beam) which is modulated in accordance with information. In this case, the second beam is pulse-modulated between high level and base level (equal to or lower than low level, and its output may be zero). In this case, an output waveform is as shown in FIG. 4.

A medium used in the basic invention is roughly classified into a first or second category. In either category, a recording medium has a multilayered structure including a recording layer (first layer) and a reference layer (second layer), as shown in FIG. 5.

The first layer is the recording layer, which exhibits a high coercivity at a room temperature, and has a low magnetization reversing temperature. The second layer is the reference layer, which exhibits a relatively lower coercivity at a room temperature and has a higher magnetization reversing temperature than those of the first layer. Each of the first and second layers may comprise a multilayered structure If necessary, a third layer may be interposed between the first and second layers. In addition, a clear boundary between the first and second layers need not be formed, and one layer can be gradually converted into the other layer.

In the first category, when the coercivity of the recording layer is represented by $H_{c1}$; that of the reference layer, $H_{c2}$; a Curie temperature of the first layer, $T_{c1}$; that of the second layer, $T_{c2}$; a room temperature, $T_R$; a temperature of the recording medium obtained when a low-level laser beam is radiated, $T_L$; that obtained when a high-level laser beam is radiated, $T_H$; a coupling field applied to the first layer, $H_{D1}$; and a coupling field applied to the second layer, $H_{D2}$, the recording medium satisfies Formula 1 below, and satisfies Formulas 2 to 5 at the room temperature:

$$T_R < T_{c1} \approx T_L < T_{c2} \approx T_H \quad\quad 1$$

$$H_{c1} > H_{c2} + |H_{D1} \mp H_{D2}| \quad\quad 2$$

$$H_{c1} > H_{D1} \quad\quad 3$$

$$H_{c2} > H_{D2} \quad\quad 4$$

$$H_{c2} + H_{D2} < |H_{ini.}| < H_{c1} \pm H_{D1} \quad\quad 5$$

In the above formulas, symbol "$\approx$" means "equal to" or "substantially equal to". In addition, of double signs $\pm$ and $\mp$, the upper sign corresponds to an A (antiparallel) type medium, and the lower sign corresponds to a P (parallel) type medium (these media will be described later). Note that a ferromagnetic medium belongs to a P type.

The relationship between a coercivity and a temperature is shown in FIG. 6. A first curve represents the characteristics of the first layer, and a second curve represents those of the second layer.

Therefore, when an initial field (Hini.) is applied to this recording medium at the room temperature, the direction of magnetization of only the reference layer (second layer) is reversed without reversing that of the recording layer (first layer) according to Formula 5. When the initial field (Hini.) is applied to the medium before recording, only the second layer can be magnetized in the "A direction" (in the drawings, the "A direction" is indicated by an upward arrow , and the "non-A direction" is indicated by a downward arrow for the sake of simplicity). If the initial field Hini. becomes zero, the direction of magnetization of the second layer can be left unchanged without being re-reversed according to Formula 4.

FIG. 7 schematically shows a state wherein only the second layer is magnetized in the "A direction" immediately before recording. The direction of magnetization * in the first layer represents previously recorded information. FIG. 8 illustrates a direction of magnetization when a high-level laser beam is radiated on the medium shown in FIG. 7, and a bit whose direction of magnetization of the first layer can be disregarded is indicated by X.

In a first condition, a high-level laser beam is radiated to increase a medium temperature to $T_H$. Since $T_H$ is higher than the Curie temperature $T_{c1}$, the magnetization of the recording layer (first layer) disappears. In addition, since $T_H$ is near the Curie temperature $T_{c2}$, the magnetization of the reference layer (second layer) also disappears completely or almost completely. The bias field (Hb) in the "A direction" or "non-A direction" is applied to the medium in accordance with the type of medium. The bias field (Hb) can be a stray field from the medium itself. For the sake of simplicity, assume that the bias field (Hb) in the "non-A direction" is applied to the medium. Since the medium is moving, a given irradiated portion is immediately separated apart from the laser beam, and is cooled. When the medium temperature is decreased under the presence of Hb, the direction of magnetization of the second layer is reversed to the "non-A direction" based on Hb (Condition $2_H$).

When the medium is further cooled and the medium temperature is decreased slightly below $T_{c1}$, Condition $3_H$ is established, and magnetization of the first layer appears again. In this case, the direction of magnetization of the first layer is influenced by that of the second layer due to a magnetic coupling (exchange coupling) force. As a result, magnetization (the P type medium) or (the A type medium) is formed according to the type of medium.

A change in condition caused by the high-level laser beam will be called a high-temperature cycle herein.

Referring to FIG. 9, a low-level laser beam is radiated to increase the medium temperature to $T_L$, thus establishing Condition $2_L$. Since $T_L$ is near the Curie temperature $T_{c1}$, the magnetization of the first layer disappears completely or almost completely. However, since $T_L$ is lower than the Curie temperature $T_{c2}$, the magnetization of the second layer does not disappear.

Although the bias field (Hb) is unnecessary, it cannot be turned on or off at high speed (within a short period of time). Therefore, the bias field (Hb) in the high-temperature cycle is left on.

However, since the $H_{c2}$ is kept high, the magnetization of the second layer will not be reversed by Hb. Since the medium is moving, a given irradiated portion is immediately separated apart from the laser beam, and is cooled. As cooling progresses, Condition $3_L$ is established, and the magnetization of the first layer appears again. The direction of magnetization appearing in this case is influenced by that of the second layer due to the magnetic coupling force. As a result, (P type) or (A type) magnetization appears according to the type of medium.

A change in condition caused by the low-level laser beam will be called a low-temperature cycle herein.

As described above, bits having either magnetization or , which are opposite to each other, are formed in the high- and low-temperature cycles regardless of the direction of magnetization of the first layer. More specifically, an over-write operation is enabled by pulse-modulating the laser beam between high level (high-temperature cycle) and low level (low-temperature cycle) in accordance with information to be recorded. This is represented in FIG. 10.

In the above description, both the first and second layers have no compensation temperature $T_{comp.}$ between the room temperature and the Curie temperature. However, when the compensation temperature $T_{comp.}$ is present, if the medium temperature exceeds it, the direction of magnetization is reversed, and a change in direction differs depending on A and P types. In addition, the direction of the bias field Hb is opposite to the direction ↓ in the above description at the room temperature.

A recording medium normally has a disk shape, and is rotated during recording. For this reason, a recorded portion (bit) is influenced again by the initial field Hini. during one revolution. As a result, the direction of magnetization of the reference layer (second layer) is aligned in the original "A direction" . However, at the room temperature, the magnetization of the second layer can no longer influence that of the recording layer (first layer), and the recorded information can be held.

If linearly polarized light is radiated on the first layer, since light reflected thereby includes information, the information can be reproduced as in the conventional magnetooptical recording medium. In addition, a method of transferring information in the first layer to the second layer aligned in the original "A direction" ⇧ by applying a reproduction field $H_R$ before reproduction or a method of naturally transferring information in the first layer to the second layer as soon as the influence of Hini. disappears without applying the reproduction field $H_R$ is also available depending on composition designs of the first and second layers. In this case, information may be reproduced from the second layer.

A perpendicular magnetic anistotroy film constituting each of the recording layer (first layer) and the reference layer (second layer) is selected from the group consisting of ferromagnetic and ferrimagnetic materials having no compensation temperature and having a Curie temperature, and an amorphous or crystalline ferrimagnetic material having both the compensation temperature and the Curie temperature.

The first category which utilizes the Curie temperature as the magnetization reversing temperature has been described. In contrast to this, the second category utilizes decreased $H_c$ at a predetermined temperature higher than the room temperature. In a medium of the second category, substantially the same description as the first category can be applied except that a temperature $T_{s1}$ at which the recording layer (first layer) is magnetically coupled to the reference layer (second layer) is used in place of $T_{c1}$ in the first category, and a temperature $T_{s1}$ at which the direction of magnetization of the second layer is reversed by Hb is used in place of $T_{c2}$.

In the second category, when the coercivity of the first layer is represented by $H_{c1}$; that of the second layer, $H_{c2}$; a temperature at which the first layer is magnetically coupled to the second layer, $T_{s1}$; a temperature at which the magnetization of the second layer is reversed by Hb, $T_{s2}$; a room temperature, $T_R$; a medium temperature obtained when a low-level laser beam is radiated, $T_L$; that obtained when a high-level laser beam is radiated, $T_H$; a coupling field applied to the first layer, $H_{D1}$; and a coupling field applied to the second layer, $H_{D2}$, the recording medium satisfies Formula 6 below, and satisfies Formulas 7 to 10 at the room temperature:

$$T_R < T_{s1} \approx T_L < T_{s2} \approx T_H \qquad 6$$

$$H_{c1} > H_{c2} + |H_{D1} \mp H_{D2}| \qquad 7$$

$$H_{c1} > H_{D1} \qquad 8$$

$$H_{c2} > H_{D2} \qquad 9$$

$$H_{c2} + H_{D2} < |Hini.| < H_{c1} \pm H_{D1} \qquad 10$$

In the above formulas, of double signs ± and ∓, the upper sign corresponds to an A type medium, and the lower sign corresponds to a P type medium (these media will be described later).

Referring to FIG. 11, in the second category, when the medium is at the high temperature $T_H$, the magnetization of the second layer does not disappear, but is sufficiently weak. The magnetization of the first layer disappears, or is sufficiently weak. Even if sufficiently weak magnetization is left in both the first and second layers, the bias field Hb is sufficiently large, and forces the direction of magnetization of the second layer and that of the first layer in some cases to follow that of the Hb, thus establishing Condition $2_H$.

Thereafter, the second layer influences the first layer via $\sigma_w$ immediately, or when cooling progresses after radiation of the laser beam is stopped and the medium temperature is decreased below $T_H$, or when the irradiated portion is away from Hb, thereby aligning the direction of magnetization of the first layer in a stable direction. As a result, Condition $3_H$ is established. When the magnetization of the first layer originally has a stable direction, it is left unchanged.

Referring to FIG. 12, when the medium is at the low temperature $T_L$, both the first and second layers do not lose their magnetization. However, the magnetization of the first layer is sufficiently weak. Therefore, the direction of magnetization of the first layer is influenced, via $\sigma_w$, by the magnetization of the second layer which is more largely influenced by Hb. In this case, since the second layer has sufficient magnetization, its magnetization will not be reversed by Hb. As a result, Condition $3_L$ is established regardless of Hb.

In the above description, both the first and second layers have no compensation temperature $T_{comp.}$ between the room temperature and the Curie temperature. When the compensation temperature $T_{comp.}$ is present, a more complex situation obtains as described above, and the direction of the bias field is opposite to the direction at the room temperature. In both the first and second categories, the recording medium is preferably constituted by the recording layer (first layer) and the reference layer (second layer) each of which comprises an amorphous ferrimagnetic material selected from transition metal (e.g., Fe, Co)—heavy rare earth metal (e.g., Gd, Tb, Dy, and the like) alloy compositions.

When the materials of both the first and second layers are selected from the transition metal-heavy rare earth metal alloy compositions, the direction and level of magnetization appearing outside the alloys are determined by the relationship between the direction and level of spin of transition metal (to be abbreviated to as TM hereinafter) atoms, and those of heavy rare earth metal (to be abbreviated to as RE hereinafter) atoms inside the alloys. For example, the direction and level of TM spin are represented by a dotted vector ⇡, those of RE spin are represented by a solid vector ↑, and the direction and level of magnetization of the entire alloy are represented by a double-solid vector ⇧. In this case, the vector ⇧ is expressed as a sum of the vectors ⇡ and ↑. However, in the alloy, the vectors ⇡ and ↑ are directed in the opposite directions due to the mutual effect of the TM spin and the RE spin. Therefore, when strengths of these vectors are equal to each other, the sum of ↓ and ↑ or the sum of ↓ and ⇡ is zero (i.e., the level of magnetization appearing outside the alloy becomes zero). The alloy composition making the sum of vectors zero is called a compensation composition. When the alloy has another composition, it has a strength equal to a difference between the strengths of the two spins, and has a vector ( ⇧ or ⇩ ) having a direction equal to that of the larger vector. Magnetization of this vector appears outside the alloy. For example, ↑↓ appears as ⇩ , and ↑↓ and appears as ⇧ .

When one of the strengths of the vectors of the RE and TM spins is larger than the other, the alloy composition is referred to as "oo rich" named after the larger spin name (e.g., RE rich).

Both the first and second layers can be classified into TM rich and RE rich compositions. Therefore, when the composition of the first layer is plotted along the ordinate and that of the second layer is plotted along the abscissa, the types of media as a whole of the basic invention can be classified into four quadrants, as shown in FIG. 13. The P type medium described above belongs to Quadrants I and III, and the A type medium belongs to Quadrants II and IV. Note that the intersection of the abscissa and the ordinate represents the compensation composition of the two layers.

In view of a change in coercivity against a change in temperature, a given alloy composition has characteristics wherein the coercivity temporarily increases infinitely and then abruptly decreases before a temperature reaches the Curie temperature (at which the coercivity is zero) The temperature corresponding to the infinite coercivity is called a compensation temperature ($T_{comp.}$). No compensation temperature is present between the room temperature and the Curie temperature in the TM rich alloy composition. A compensation temperature below the room temperature is irrelevant in the magnetooptical recording, and hence, it is assumed in this specification that the compensation temperature is present between the room temperature and the Curie temperature.

If the first and second layers are classified in view of the presence/absence of the compensation temperature, the recording medium can be classified into four types. A medium in Quadrant I includes all the four types of media. FIGS. 14A, 14B, 14C, and 14D show the relationship between the coercivity and temperature of these four types of media.

When the recording layer (first layer) and the reference layer (second layer) are classified in view of their RE or TM rich characteristics and in view of the presence/absence of the compensation temperature, recording media can be classified into the following nine classes.

TABLE 1

| Class | | | Type |
|---|---|---|---|
| Quadrant I (P type) | | | |
| | First Layer: RE Rich | Second Layer: RE Rich | |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |
| Quadrant II (A type) | | | |
| | First Layer: RE Rich | Second Layer: TM Rich | |
| 5 | $T_{comp.}$ | No $T_{comp.}$ | 3 |
| 6 | No $T_{comp.}$ | No $T_{comp.}$ | 4 |
| Quadrant III (P type) | | | |
| | First Layer: TM Rich | Second Layer: TM Rich | |
| 7 | No $T_{Comp.}$ | No $T_{comp.}$ | 4 |
| Quandrant IV (A type) | | | |
| | First Layer: TM Rich | Second Layer: RE Rich | |
| 8 | No $T_{comp.}$ | $T_{comp.}$ | 2 |
| 9 | No $T_{comp.}$ | No $T_{comp.}$ | 4 |

In general, as considered from a direction perpendicular to a magnetic layer plane, spiral or concentrical tracks for recording information are formed on a disk, and a separation zone is present between adjacent tracks.

In the manufacture of a medium, directions of magnetization of magnetic layer portions located in the separation zones are often nonuniform. When overwrite recording is carried out, since it is generally impossible to focus a magnetic field onto a narrow region as small as a track width, an initial field Hini. is applied to the separation zones located on two sides of each track, and directions of magnetization of the reference layer portions in the separation zones are aligned along the direction of the initial field Hini. Thus, in a portion where the direction of magnetization of the recording layer in the separation zone is unstable with respect to the reference layer, a magnetic wall is formed between the recording layer and the reference layer. If the initial field Hini. is carelessly applied even though the directions of magnetization are not nonuniform, a magnetic wall may be formed in the entire region of the separation zone.

When recording is performed according to the basic invention, a C/N ratio may be decreased or previous information may be reproduced due to the above-mentioned causes, and an information bit error rate may be undesirably increased.

The present inventors have made extensive studies, and found that when a magnetic wall is present between the recording layer and the reference layer in the separation zone, the above-mentioned problems are posed.

It is an object of the present invention to provide a method of processing a medium so as to decrease an information bit error rate during reproduction of information.

DISCLOSURE OF INVENTION

According to the present invention, in order to achieve the above object, a recording medium is used which includes a recording layer and a reference layer having a perpendicular magnetic anisotropy, and on which a plurality of tracks for recording information are formed and separation zones are formed between adjacent tracks. Before information is recorded on the medium, an initial field is applied to the medium to align the direction of magnetization of the reference layer in a first predetermined direction without changing the direction of magnetization of the recording layer. A pre-processing field is applied to the separation zones so as to avoid the formation of a magnetic wall between the recording layer and the reference layer in each separation zone upon application of the initial field, by aligning the direction of magnetization of the recording layer in each separation zone in a second predetermined direction.

Information is then recorded on the disk medium which is pre-processed in this manner. Before recording, the reference layer of each track of the medium is subjected to the initial field Hini. Since it is difficult to focus the initial field Hini. to a narrow range as small as a track width, it also influences the separation zones beyond the track. For this reason, when an expected application direction of the initial field Hini. is different from the direction of the initial field Hini. which is applied in practical recording, a magnetic wall is undesirably formed between the recording layer and the reference layer in each separation zone.

Therefore, according to the present invention, the direction of the initial field Hini. is indicated on a disk itself or a container storing the disk, so that a direction of the initial field Hini. expected in pre-processing is not different from that of the initial field Hini. applied during actual recording.

According to the present invention, when the direction of magnetization of the recording layer is aligned in a stable direction with respect to the direction of magnetization of the reference layer in each separation zone so as to completely eliminate a magnetic wall, the following methods are available.

(1) A large pre-processing field is applied to the entire medium or the entire recording region where tracks are formed at normal temperature. With this method, the direction of magnetization of the recording layer in both the separation zone and track is aligned in one direction.

(2) A method of heating the entire medium or the entire recording region where tracks are formed to decrease a coercivity of the medium, and then applying a pre-processing field to the heated portion. With this method, the direction of magnetization of the recording layer in both the separation zone and track can also be aligned in one direction.

(3) A method of heating separation zones while applying, to the separation zones, a pre-processing field having a strength equal to or higher than that of a bias field Hb of the basic invention and having a direction opposite to that of the bias field Hb. As a heating method, for example, a non-modulated laser beam fixed at high level or higher is radiated on the separation zones simultaneously with application of the pre-processing field. With this method, the direction of magnetization of the recording layer in each separation zone is aligned in one direction.

In general, a groove is continuously or intermittently formed in each separation zone, and in this case, a track is called a land.

Media of the basic invention can be roughly classified into P type media and A type media. In the former type, when the directions of magnetization of the recording layer and the reference layer are equal to each other, magnetization is stable, and no magnetic wall can be formed between the two layers. In the latter type, when the directions of magnetization of the recording layer and the reference layer are opposite to each other, magnetization is stable, and no magnetic wall can be formed between the two layers.

The principle of an over-write operation will be described in detail below using a medium No. 1 belonging to Class 1 (P type, Quadrant I, Type 1) shown in Table 1.

The medium No. 1 satisfies Formula 11:

$$T_R < T_{comp.1} < T_L < T_H \lesssim T_{c1} \lesssim T_{c2}$$

and also satisfies Formula 11-2:

$$T_{comp.2} < T_{c1}$$

For the sake of simplicity, a medium having a relation of $T_H < T_{c1} < T_{c2}$ will be considered below. The temperature $T_{comp.2}$ may be higher than, equal to, or lower than $T_L$. For the sake of simplicity, $T_L < T_{comp.2}$ in the following description. FIG. 15 shows the above-mentioned relationship.

A condition that reverses only the direction of magnetization of the second layer without reversing that of the first layer (recording layer) by the initial field Hini. at the room temperature $T_R$ is represented by Formula 12. This medium No. 1 satisfies Formula 12.

Formula 12:

$$H_{C1} > H_{C2} + \frac{\sigma_w}{2M_{S1}t_1} + \frac{\sigma_w}{2M_{S2}t_2}$$

where
- $H_{C1}$: coercivity of first layer
- $H_{C2}$: coercivity of second layer
- $M_{S1}$: saturation magnetization of first layer
- $M_{S2}$: saturation magnetization of second layer
- $t_1$: film thickness of first layer
- $t_2$: film thickness of second layer
- $\sigma_w$: interface wall energy At this time, a condition for Hini. is represented by Formula 15. If Hini. disappears, the directions of magnetization of the first and second layers are influenced by each other due to the interface wall energy. The conditions that can hold the directions of magnetization of the first and second layers without reversing them are represented by Formulas 13 and 14. The medium No. 1 satisfies Formulas 13 and 14.

Formula 13:

$$H_{C1} > \frac{\sigma_w}{2M_{S1}t_1}$$

Formula 14:

$$H_{C2} > \frac{\sigma_w}{2M_{S2}t_2}$$

The magnetization of the second layer of the recording medium which satisfies conditions given by Formulas 12 to 14 at the room temperature is aligned in, e.g., the "A direction" ↑ ( ↑↓ ) by Hini. which satisfies following Formula 15 immediately before recording:

Formula 15:

$$H_{C2} + \frac{\sigma_w}{2M_{S2}t_2} < |Hini.| < H_{C1} - \frac{\sigma_w}{2M_{S1}t_1}$$

At this time, the first layer is left in the previous recorded state, as shown in Conditions $1_a$ and $1_b$ in FIG. 16. When the direction of magnetization of the first layer is aligned in the "non-A direction", a magnetic wall is formed between the first and second layers. Conditions $1_a$ and $1_b$ are held immediately before recording.

The bias field Hb is then applied in the "A direction" ↑.

Note that it is difficult to focus the bias field Hb to the same range as a radiation region (spot region) of the laser beam as well as normal magnetic fields. When a medium has a disk shape, recorded information (bit) is influenced by Hini. during one revolution, and Condition 1 appears again. The bit passes a portion near the laser beam radiation region (spot region). At this time, the bit in Condition 1 is influenced by a bias field Hb apply means since the bit approaches it. In this case, if the direction of magnetization of the bit of the first layer having the direction of magnetization opposite to that of Hb is reversed by Hb, information which has been recorded one revolution before is lost. A condition for preventing this is given by:

Formula 15-2:

$$H_{C1} > Hb + \frac{\sigma_w}{2M_{S1}t_1}$$

The disk-like medium must satisfy this formula at the room temperature. In other words, a condition for determining Hb is expressed by Formula 15-2.

The bit in Conditions $1_a$ and $1_b$ then reaches the spot region of the laser beam. The laser beam intensity includes two levels, i.e., high and low levels.

A low-level laser beam is radiated, and a medium temperature is increased beyond $T_{comp.1}$. Thus, the medium type is shifted from P type to A type. Although the directions of the RE and TM spins of the first layer are left unchanged, the relationship between their strengths is reversed. As a result, the direction of magnetization of the first layer is reversed, as shown in Conditions $2_{La}$ and $2_{Lb}$ in FIG. 16.

Therefore the temperature reaches $T_L$. Thus the following relation is established:

$$H_{C1} + Hb < \frac{\sigma_w}{2M_{S1}t_1}$$

Even if $Hb \uparrow$ is present, Condition $2_{La}$ transitions to Condition $3_L$ in FIG. 16. Meanwhile, since Condition $2_{Lb}$ remains the same regardless of $Hb \uparrow$, it becomes the same Condition $3_L$.

In this state, when the bit falls outside the spot region of the laser beam, the medium temperature begins to be decreased. When the medium temperature is decreased below $T_{comp.1}$, the medium type is restored from A type to original P type. The relationship between the strengths of the RE and TM spins of the first layer is reversed ( ↑↓ → ↑↓ ).

As a result, the direction of magnetization of the first layer is reversed to the "A direction" ⓪, as shown in Condition $4_L$ in FIG. 16.

Condition $4_L$ is held even when the medium temperature is decreased to the room temperature. As a result, a bit in the "A direction" ⓪ is formed in the first layer.

A high-temperature cycle will be described below with reference to FIG. 17.

When a high-level laser beam is radiated, the medium temperature is increased to the low temperature $T_L$ via $T_{comp.1}$. As a result, the same Condition $2_H$ as Condition $3_L$ is established.

Under radiation of the high-level laser beam, the medium temperature is further increased. When the medium temperature exceeds $T_{comp.2}$ of the second layer, the medium type is shifted from A type to P type. Although the directions of the RE and TM spins of the second layer remain the same, the relationship between their strengths is reversed ( ↑↓ → ↑↓ ). For this reason, the direction of magnetization of the second layer is reversed, i.e., the "non-A-directed" ⓪ magnetization appears (Condition $3_H$).

However, since $H_{C2}$ is still large at this temperature, the magnetization of the second layer will not be reversed by ↑ Hb. When the temperature is further increased and reaches $T_H$, the coercivity of the first and second layers are decreased since $T_H$ is near the Curie temperature. As a result, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

-continued $$Hb > H_{C1} + \frac{\sigma_w}{2M_{S1}t_1} \quad (2)$$

and $$Hb > H_{C2} - \frac{\sigma_w}{2M_{S2}t_2}$$

$$Hb > H_{C1} - \frac{\sigma_w}{2M_{S1}t_1} \quad (3)$$

and $$Hb > H_{C2} + \frac{\sigma_w}{2M_{S2}t_2}$$

For this reason, the directions of magnetization of the two layers are reversed at almost the same time, and follow the direction of Hb. This condition corresponds to Condition $4_H$.

When the bit falls outside the spot region of the laser beam in this condition, the medium temperature begins to fall. When the medium temperature is decreased below $T_{comp.2}$, the medium type is shifted from P type to A type. Although the directions of the RE and TM spins are left unchanged, the relationship between their strengths is reversed ( ↓↑ → ↓↑ ). As a result, the direction of magnetization of the second layer is reversed from ⓪ to the "non-A direction" ⓪ (Condition $5_H$).

When the medium temperature is further decreased from the temperature in Condition $5_H$ below $T_{comp.1}$, the medium type is restored from A type to original P type. The relationship between the strengths of the RE and TM spins of the first layer is then reversed ( ↓↑ → ↓↑ ). As a result, the direction of magnetization of the first layer is reversed to the "non-A direction" ⓪ (Condition $6_H$).

The medium temperature is then decreased from the temperature in Condition $6_H$ to the room temperature. Since $H_{C1}$ at the room temperature is sufficiently large (Formula 15-3), the magnetization ⓪ of the first layer will not be reversed by ↑ Hb, and Condition $6_H$ is maintained.

Formula 15-3:

$$Hb < H_{C1} + \frac{\sigma_w}{2M_{S1}t_1}$$

In this manner, a bit in the "non-A direction" is formed in the first layer.

The principle of the over-write operation will be described below using a specific medium No. 2 belonging to a recording medium of Class 2 (P type, Quadrant I, and Type 2) shown in Table 1.

The medium No. 2 has a relation given by Formula 16:

$$T_R < T_{C1} \approx T_L < T_{comp.2} < T_{C2} \approx T_H$$

FIG. 18 shows this relation.

A condition for reversing only the direction of magnetization of the second layer by the initial field Hini. without reversing that of the first layer at the room temperature $T_R$ is given by Formula 17. This medium No. 2 satisfies Formula 17.

Formula 17:

$$H_{C1} > H_{C2} + \frac{\sigma_w}{2M_{S1}t_1} + \frac{\sigma_w}{2M_{S2}t_2}$$

In this case, a condition for Hini. is given by Formula 20. When Hini. disappears, the reversed magnetization of the second layer is influenced by that of the first layer due to the exchange coupling force. Conditions for holding the magnetization of the second layer without re-reversing it are given by Formulas 18 and 19. The medium No. 2 satisfies Formulas 18 and 19.

Formula 18:

$$H_{C1} > \frac{\sigma_w}{2M_{S1}t_1}$$

Formula 19:

$$H_{C2} > \frac{\sigma_w}{2M_{S2}t_2}$$

Formula 20:

$$H_{C2} + \frac{\sigma_w}{2M_{S2}t_2} < |Hini.| < H_{C1} - \frac{\sigma_w}{2M_{S1}t_1}$$

Magnetization of the second layer of the recording medium which satisfies Conditions given by Formulas 17 to 19 at the room temperature is aligned in, e.g., the "A direction" $\emptyset$ ( ↑↓ ) by Hini. satisfying Formula 20 immediately before recording. In this case, the first layer is left in a recorded state, as shown in FIG. 19.

This Condition 1 is maintained immediately before recording. In this case, the bias field (Hb) is applied in a direction of ↑.

A low-temperature cycle will be described below with reference to FIG. 19.

A low-level laser beam is radiated to increase the medium temperature to $T_L$. Since $T_L$ is almost equal to the Curie temperature $T_{C1}$ of the first layer, its magnetization disappears, and Condition $2_L$ is established.

In Condition $2_L$, when the bit falls outside the spot region of the laser beam, the medium temperature begins to be decreased. When the medium temperature is decreased slightly below $T_{C1}$, RE and TM spins ( ↑↓ ) of the second layer influence those of the first layer due to the exchange coupling force. That is, a force acts to respectively align RE spins ( ↑ ) and TM spins ( ↓ ). As a result, magnetization ↑↓, i.e., $\emptyset$ appears in the first layer, thus setting Condition $3_L$.

Condition $3_L$ is left unchanged even when the medium temperature is further decreased. As a result, a bit in the "A direction" $\emptyset$ is formed in the first layer.

A high-temperature cycle will be described below with reference to FIG. 20.

When a high-level laser beam is radiated and increases the medium temperature to $T_L$, since $T_L$ is almost equal to the Curie temperature $T_{C1}$ of the first layer, its magnetization disappears, and Condition $2_H$ is set.

When the medium temperature slightly exceeds $T_{comp.2}$ of the second layer, the relationship between the strengths of RE and TM spins are reversed ( ↑↓ → ↑↓ ) although their directions are left unchanged. For this reason, the magnetization of the entire alloy is reversed to the "non-A direction" $\emptyset$ , and Condition $3_H$ is established. However, since $H_{C2}$ is still large at this temperature, the magnetization of the second layer will not be reversed by ↑ Hb. When the temperature is further increased and reaches $T_H$, the temperature of the second layer becomes almost equal to the Curie temperature $T_{C2}$, and its magnetization disappears, thus setting Condition $4_H$.

When the bit falls outside the spot region of the laser beam in Condition $4_H$, the medium temperature begins to fall. When the medium temperature is decreased slightly below $T_{C2}$, magnetization appears in the second layer. In this case, magnetization $\emptyset$ ( ↓↑ ) appears due to ↑ Hb. However, since the temperature is still higher than $T_{C1}$, no magnetization appears in the first layer. This condition corresponds to Condition $5_H$.

When the medium temperature is further decreased and becomes equal to or lower than $T_{comp.2}$, the relationship between the strengths of RE and TM spins is reversed ( ↓↑ → ↓↑ ) although their directions are left unchanged. As a result, the magnetization of the entire alloy is reversed from $\emptyset$ to the "non-A direction" $\emptyset$ , and Condition $6_H$ is set.

In Condition $6_H$, since the medium temperature is higher than $T_{C1}$, magnetization of the first layer does not appear. In addition, since $H_{C2}$ at this temperature is large, the magnetization of the second layer will not be reversed by ↑ Hb.

When the temperature is further decreased slightly below $T_{C1}$, magnetization appears in the first layer. In this case, the exchange coupling force from the second layer acts to respectively align the RE spins ( ↓ ) and TM spins ( ↑ ). For this reason, magnetization ↓↑ , i.e., $\emptyset$ appears in the first layer. This condition corresponds to Condition $7_H$.

The medium temperature is then decreased from the temperature in Condition $7_H$ to the room temperature. Since $H_{C1}$ at the room temperature is sufficiently large, the magnetization of the first layer will not be reversed by ↑ Hb, and Condition $7_H$ can be maintained. Thus, formation of a bit in the "non-A direction" is completed.

The principle of the over-write operation will be described in detail below using a specific medium No. 3 belonging to a recording medium of Class 3 (P type, Quadrant I, Type 3) shown in Table 1.

This medium No. 3 has a relation given by Formula 21:

$$T_R < T_{comp.1} < T_{C1} \approx T_L < T_{C2} \approx T_H$$

FIG. 21 shows this relation.

A condition for reversing only the magnetization of the second layer by the initial field Hini. without reversing that of the first layer at the room temperature $T_R$ is given by Formula 22. This medium No. 3 satisfies Formula 22.

Formula 22:

$$H_{C1} > H_{C2} + \frac{\sigma_w}{2M_{S1}t_1} + \frac{\sigma_w}{2M_{S2}t_2}$$

In this case, a condition for Hini. is represented by Formula 25. When Hini. disappears, the reversed magnetization of the second layer is influenced by that of the first layer due to the exchange coupling force. Conditions for maintaining the magnetization of the second layer without re-reversing it are given by Formulas 23 and 24. This medium No. 3 satisfies Formula 23 and 24.

Formula 23:

$$H_{C1} > \frac{\sigma_w}{2M_{S1}t_1}$$

Formula 24:

$$H_{C2} > \frac{\sigma_w}{2M_{S2}t_2}$$

Formula 25:

$$H_{C2} + \frac{\sigma_w}{2M_{S2}t_2} < |H_{ini.}| < H_{C1} - \frac{\sigma_w}{2M_{S1}t_1}$$

Magnetization of the second layer of the recording medium which satisfies the conditions given by Formulas 22 to 24 at the room temperature is aligned in, e.g., the "A direction" ⇑ ( ↑⇂ ) by Hini. satisfying a condition given by Formula 25 immediately before recording. In this case, the first layer is left in the recorded state, as shown in Condition 1 in FIG. 22.

This Condition 1 is held immediately before recording. In this case, the bias field (Hb) is applied in a direction of ↓. A low-temperature cycle will be described below with reference to FIG. 22.

A low-level laser beam is radiated to increase the medium temperature to $T_L$. Since $T_L$ is almost equal to the Curie temperature $T_{C1}$ of the first layer, its magnetization disappears. However, since $H_{C2}$ of the second layer is still large at this temperature, its magnetization will not be reversed by ↓ Hb, and Condition $2_L$ is established.

When the bit falls outside the spot region of the laser beam in Condition $2_L$, the medium temperature begins to fall. When the medium temperature is decreased slightly below $T_{C1}$, the RE and TM spins ( ↑⇂ ) of the second layer influence those of the first layer due to the exchange coupling force. More specifically, a force acts to respectively align RE spins ( ↑ ) and TM spins ( ⇂ ). As a result, magnetization ↑⇂ , i.e., ⇑ appears in the first layer. In this case, since the temperature is equal to or higher than $T_{comp.1}$, the TM spin becomes larger, and Condition $3_L$ is established.

When the medium temperature is decreased below $T_{comp.1}$, the relationship between the strengths of the RE and TM spins of the first layer is reversed like in the high-temperature cycle ( ↑⇂ → ↑⇂ ). As a result, the magnetization of the first layer overcomes ↓ Hb and is aligned in ⇑ , thus setting Condition $4_L$.

This Condition $4_L$ is maintained even when the medium temperature is decreased to the room temperature. As a result, a bit in the "A direction" ⇑ is formed.

A high-temperature cycle will be described below with reference to FIG. 23.

When a high-level laser beam is radiated and increases the medium temperature to $T_L$, since $T_L$ is almost equal to the Curie temperature $T_{C1}$ of the first layer, its magnetization disappears, and Condition $2_H$ is established.

When the medium temperature reaches $T_H$, since $T_H$ is almost equal to $T_{C2}$ of the second layer, its magnetization also disappears, and Condition $3_H$ is established.

When the bit falls outside the spot region of the laser beam in Condition $3_H$, the medium temperature begins to fall. When the medium temperature is decreased slightly below $T_{C2}$, magnetization appears in the second layer. In this case, magnetization ⇓ ( ↓↑ ) appears due to ↓ Hb. However, since the temperature is still higher than $T_{C1}$, no magnetization appears in the first layer. This condition corresponds to Condition $4_H$.

When the medium temperature is further decreased slightly below $T_{C1}$, magnetization also appears in the first layer. In this case, the magnetization of the second layer influences that of the first layer due to the exchange coupling force. As a result, a force acts to respectively align RE spins ( ↓ ) and TM spins ( ↑ ). In this case, since the medium temperature is equal to or higher than $T_{comp.1}$, the TM spins are larger than RE spins ( ↓↑ ). As a result, magnetization ( ⇓ ) appears in the second layer, and Condition $5_H$ is established.

When the medium temperature is further decreased from the temperature in Condition $5_H$ and becomes equal to or lower than $T_{comp.1}$, the relationship between the strengths of the TM and RE spins of the first layer is reversed ( ↓↑ → ↓↑ ). For this reason, the direction of magnetization of the first layer is reversed to the "non-A direction" ⇓ , and Condition $6_H$ is established.

The medium temperature is then decreased from the temperature in Condition $6_H$ to the room temperature. Since $H_{C1}$ at the room temperature is sufficiently large, the magnetization of the first layer is stably held.

Thus, a bit in the "non-A direction" is formed.

The principle of the over-write operation will be described in detail below using a specific medium No. 4 belonging to a recording medium of Class 4 (P type, Quadrant I, Type 4) shown in Table 1.

This medium No. 4 has a relation given by Formula 26:

$$T_R < T_L < T_H < T_{C1} < T_{C2}$$

For the sake of simplicity, $T_H < T_{C1} < T_{C2}$ in the following description. FIG. 24 shows this relation.

A condition for reversing only the direction of magnetization of the second layer by the initial field Hini. without reversing that of the first layer at the room temperature $T_R$ is represented by Formula 27. The medium No. 4 satisfies Formula 27.

Formula 27:

$$H_{C1} > H_{C2} + \frac{\sigma_w}{2M_{S1}t_1} + \frac{\sigma_w}{2M_{S2}t_2}$$

In this case, a condition for Hini. is represented by Formula 30. When Hini. disappears, the directions of magnetization of the first and second layers are influenced by the exchange coupling force. Conditions for maintaining the directions of magnetization of the first and second layers without reversing them are given by Formulas 28 and 29. This medium No. 4 satisfies Formulas 28 and 29.

Formula 28:

$$H_{C1} > \frac{\sigma_w}{2M_{S1}t_1}$$

Formula 29:

$$H_{C2} > \frac{\sigma_w}{2M_{S2}t_2}$$

The magnetization of the second layer of the recording medium which satisfies the conditions given by Formulas 27 to 29 at the room temperature is aligned in, e.g., the "A direction" ⇑ ( ↑⇂ ) by Hini. which satisfies Formula 30 immediately before recording:

Formula 30:

$$H_{C2} + \frac{\sigma_w}{2M_{S2}t_2} < |H_{ini.}| < H_{C1} - \frac{\sigma_w}{2M_{S1}t_1}$$

At this time, the first layer is left in the recorded state shown in Condition 1a or 1b in FIG. 25 Condition 1a or 1b is maintained immediately before recording. The bias field Hb is assumed to be applied in the "non-A direction" ↓.

When the medium has a disk shape, a condition for inhibiting magnetization of a recorded bit (in particular, a bit in Condition 1b in which the direction of magnetization of the first layer is opposite to the direction of Hb) from being reversed by Hb when it approaches an Hb apply means is represented by Formula 30-2:

$$Hb < H_{C1} + \frac{\sigma_w}{2M_{S1}t_1}$$

The disk medium must satisfy this formula at the room temperature. A condition for inhibiting the initialized second layer from being reversed by Hb when it approaches the Hb apply means is represented by Formula 30-3:

$$Hb < H_{C2} - \frac{\sigma_w}{2M_{S2}t_2}$$

In other words, conditions for determining Hb are Formulas 30-2 and 30-3.

A bit in Condition 1a or 1b then reaches the spot region of the laser beam.

A low-temperature cycle will be described below with reference to FIG. 25.

A low-level laser beam is radiated, and the medium temperature is increased to $T_L$. Thus, a condition which can satisfy the following relation is established, and Condition 1a transitions to Condition $2_L$:

$$H_{C1} + Hb < \frac{\sigma_w}{2M_{S1}t_1}$$

On the other hand, since Condition 1b is left unchanged, it becomes the same Condition $2_L$.

In Condition $2_L$, when the bit falls outside the spot region of the laser beam, the medium temperature begins to be decreased. Even when the medium temperature is decreased to the room temperature, Condition $2_L$ is maintained since its $H_{C1}$ at the room temperature is sufficiently large (see Formula 30-4).

Formula 30-4:

$$Hb < H_{C1} + \frac{\sigma_w}{2M_{S1}t_1}$$

As a result, a bit in the "A direction" ↕ is formed in the first layer.

A high-temperature cycle will be described below with reference to FIG. 26.

When a high-level laser beam is radiated, the medium temperature is increased to the low temperature $T_L$. As a result, Condition $2_H$ equal to Condition $2_L$ in the low-temperature cycle is established.

When the medium temperature is further increased up to $T_H$, the coercivity is decreased since $T_H$ approaches the Curie temperatures of the first and second layers. As a result, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \quad (1)$$

$$\text{and } Hb > \frac{M_{S1}t_1 H_{C1} + M_{S2}t_2 H_{C2}}{M_{S1}t_1 + M_{S2}t_2}$$

$$Hb < H_{C1} + \frac{\sigma_w}{2M_{S1}t_1} \quad (2)$$

$$\text{and } Hb > H_{C2} - \frac{\sigma_w}{2M_{S2}t_2}$$

$$Hb > H_{C1} - \frac{\sigma_w}{2M_{S1}t_1} \quad (3)$$

$$\text{and } Hb > H_{C2} + \frac{\sigma_w}{2M_{S2}t_2}$$

For this reason, the direct two layers are almost simultaneously reversed to follow the direction of Hb. This condition corresponds to Condition $3_H$.

When the bit falls outside the spot region of the laser beam in Condition $3_H$, the medium temperature is begins to be decreased. The medium temperature is then decreased to the room temperature. However, Condition $3_H$ is left unchanged.

Thus, a bit in the "non-A direction" ↕ is formed in the first layer.

The principle of the over-write operation will be described in detail below using a medium No. 5 belonging to a recording medium of Class 5 (A type, Quadrant II, Type 3) shown in Table 1.

This medium No. 5 has a relation given by Formula 31:

$$T_R < T_{comp.1} < T_L < T_H \lesssim T_{C1} \lesssim T_{C2}$$

For the sake of simplicity, $T_H < T_{C1} < T_{C2}$ in the following description. FIG. 27 shows this relation.

A condition for reversing only the direction of magnetization of the second layer by the initial field Hini. without reversing that of the first layer at the room temperature $T_R$ is represented by Formula 32. This medium No. 5 satisfies Formula 32.

Formula 32:

$$H_{C1} > H_{C2} + \left| \frac{\sigma_w}{2M_{S1}t_1} - \frac{\sigma_w}{2M_{S2}t_2} \right|$$

In this case, a condition for Hini. is represented by Formula 35. When Hini. disappears, the directions of magnetization of the first and second layers are influenced by each other due to the interface wall energy. Conditions for maintaining the directions of magnetization of the first and second layers without reversing them are represented by Formulas 33 and 34. This medium No. 5 satisfies Formulas 33 and 34.

Formula 33:

$$H_{C1} > \frac{\sigma_w}{2M_{S1}t_1}$$

Formula 34:

$$H_{C2} > \frac{\sigma_w}{2M_{S2}t_2}$$

Magnetization of the second layer of the recording medium which satisfies the conditions given by Formulas 32 to 34 at the room temperature is aligned in, e.g., the "A direction" ⇑ ( ↓↑ ) by Hini. which satisfies Formula 35 immediately before recording:

Formula 35:

$$H_{C2} + \frac{\sigma_w}{2M_{S2}t_2} > |H_{ini.}| > H_{C1} + \frac{\sigma_w}{2M_{S1}t_1}$$

At this time, the first layer is left in the recorded state shown in Condition $1_a$ or $1_b$ in FIG. 28. This Condition $1_a$ or $1_b$ is maintained immediately before recording.

The bias field Hb is assumed to be applied in the "non-A direction" ↓.

When the medium has a disk shape, a condition for inhibiting magnetization of a previously recorded bit (in particular, a bit in Condition $1_a$ in which the direction of magnetization of the first layer is opposite to the direction of Hb) from being reversed by Hb when it approaches an Hb apply means is represented by Formula 35-2:

$$Hb < H_{C1} - \frac{\sigma_w}{2M_{S1}t_1}$$

The disk medium must satisfy this formula at the room temperature. A condition for inhibiting the initialized second layer from being reversed by Hb when it approaches the Hb apply means is represented by Formula 35-3:

$$Hb < H_{C2} - \frac{\sigma_w}{2M_{S2}t_2}$$

In other words, conditions for determining Hb are Formulas 35-2 and 35-3.

A low-temperature cycle will be described below with reference to FIG. 28.

A low-level laser beam is radiated, and the medium temperature is increased beyond $T_{comp.1}$. The medium type is changed from A type to P type. The relationship between the strengths of the RE and TM spins of the first layer is reversed although their directions are left unchanged. For this reason, the direction of magnetization of the first layer is reversed, so that Condition $1_a$ becomes Condition $2_{La}$, and Condition $1_b$ becomes Condition $2_{Lb}$.

When the medium temperature is further increased from this state up to $T_L$, the following formula is satisfied:

$$H_{C1} + Hb < \frac{\sigma_w}{2M_{S1}t_1}$$

Thus, Condition $2_{La}$ transitions to Condition $3_L$. Meanwhile, since Condition $2_{Lb}$ is left unchanged, it becomes the same Condition $3_L$.

When the bit falls outside the spot region of the laser beam in this condition, the medium temperature begins to be decreased. When the medium temperature is decreased below $T_{comp.1}$, the medium type is restored from P type to original A type. The relationship between the strengths of RE and TM spins of the first layer is reversed ( ↓↑ → ↓↑ ). As a result, the direction of magnetization of the first layer is reversed to the "non-A direction" ⇓. This condition corresponds to Condition $4_L$.

The medium temperature is then decreased to the room temperature, and Condition $4_L$ is maintained.

As a result, a bit in the "non-A direction" ⇓ is formed in the first layer.

A high-temperature cycle will be described below with reference to FIG. 29.

When a high-level laser beam is radiated, the medium temperature is increased to the low temperature $T_1$ via $T_{comp.1}$. As a result, Condition $2_H$ equal to Condition $3_L$ is established.

When the reaches $T_H$, the coersivities of the two layers are decreased since $T_H$ is near the Curie temperatures of the first and second layers. As a result, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

and $$Hb > H_{C2} - \frac{\sigma_w}{2M_{S2}t_2}$$

$$Hb > H_{C1} - \frac{\sigma_w}{2M_{S1}t_1} \quad (3)$$

and $$Hb > H_{C2} + \frac{\sigma_w}{2M_{S2}t_2}$$

For this reason, the directions of magnetization of the two layers are almost simultaneously reversed to follow the direction of Hb. This condition corresponds to Condition $3_H$.

When the bit falls outside the spot region of the laser beam in Condition $3_H$, the medium temperature begins to be decreased. When the medium temperature is decreased below $T_{comp.1}$, the medium type is restored from P type to original A type. The relationship between the strengths of TM and RE spins of the first layer is reversed ( ↑↓ → ↑↓ ). For this reason, the direction of magnetization of the first layer is reversed to the "A direction" ⇑ (Condition $4_H$). The medium temperature is decreased from the temperature in Condition $4_H$ to the room temperature. $H_{C1}$ at the room temperature is sufficiently large, and Formula 35-4 is satisfied:

Formula 35-4:

$$Hb < H_{C1} + \frac{\sigma_w}{2M_{S1}t_1}$$

Therefore, the magnetization of the first layer is stably maintained in Condition $4_H$.

Thus, a bit in the "A direction" is formed in the first layer.

The principle of the over-write operation will be described in detail below using a specific medium No. 6 belonging to a recording medium of Class 6 (A type, Quadrant II, Type 4) shown in Table 1.

This medium No. 6 has a relation given by Formula 36:

$$T_R < T_{C1} \approx T_L < T_{C2} \approx T_H$$

FIG. 30 shows this relation.

A condition for reversing only the direction of magnetization of the second layer by the initial field Hini. without reversing that of the first layer at the room temperature $T_R$ is represented by Formula 37. This medium No. 6 satisfies Formula 37.

Formula 37:

$$H_{C1} > H_{C2} + \left| \frac{\sigma_w}{2M_{S1}t_1} - \frac{\sigma_w}{2M_{S2}t_2} \right|$$

A condition for Hini. at this time is given by Formula 40. When Hini. disappears, the reversed magnetization of the second layer is influenced by that of the first layer due to the exchange coupling force. Conditions for holding the magnetization of the second layer without re-reversing it are given by Formulas 38 and 39. This medium No. 6 satisfies Formulas 38 and 39.

Formula 38:

$$H_{C1} > \frac{\sigma_w}{2M_{S1}t_1}$$

Formula 39:

$$H_{C2} > \frac{\sigma_w}{2M_{S2}t_2}$$

Formula 40:

$$H_{C2} + \frac{\sigma_w}{2M_{S2}t_2} < |\text{Hini.}| < H_{C1} + \frac{\sigma_w}{2M_{S1}t_1}$$

The magnetization of the second layer of the recording medium which satisfies the conditions given by Formulas 37 to 39 at the room temperature is aligned in, e.g. the "A direction" ↕ ( ↓↑ ) by Hini. which satisfies the condition given by Formula 40 immediately before recording. At this time, the first layer is kept in the recorded state, as shown in Condition 1 in FIG. 31. Condition 1 is maintained immediately before recording. In this case, the bias field (Hb) is applied in a direction of ↓.

A low-temperature cycle will be described below with reference to FIG. 31.

A low-level laser beam is radiated to increase the medium temperature to $T_L$. Since $T_L$ is almost equal the Curie temperature $T_{C1}$ of the first layer, its magnetization disappears. In this condition, since $H_{C2}$ is sufficiently large, the magnetization ↕ of the second layer will not be reversed by ↓ Hb. This condition corresponds to Condition $2_L$.

When the bit falls outside the spot region of the laser beam in Condition $2_L$, the medium temperature begins to be decreased. When the medium temperature is decreased slightly below $T_{C1}$, the RE and TM spins ( ↓↑ ) of the second layer influence those of the first layer due to the exchange coupling force. The exchange coupling force acts to respectively align the RE spins ( ↓ ) and TM spins ( ↑ ). As a result, magnetization ↓↑ , i.e., ↕ appears in the first layer. This condition corresponds to Condition $3_L$.

Condition $3_L$ is maintained even when the medium temperature is decreased to the room temperature. As a result, a bit in the "non-A direction" ↕ is formed.

A high-temperature cycle will be described below with reference to FIG. 32.

When a high-level laser beam is radiated and increases the medium temperature to $T_L$, since $T_L$ is almost equal to the Curie temperature $T_{C1}$ of the first layer, its magnetization disappears, i.e., Condition $2_H$ is established.

When the medium temperature is further increased up to $T_H$, since the temperature $T_H$ of the second layer is almost equal to $T_{C2}$, its magnetization also disappears. This condition corresponds to Condition $3_H$.

When the bit falls outside the spot region of the laser beam in Condition $3_H$, the medium temperature begins to be decreased. When the medium temperature is decreased slightly below $T_{C2}$, magnetization appears in the second layer. In this case, magnetization ↕ ( ↑↓ ) appears due to ↓ Hb. However, since the temperature is higher than $T_{C1}$, no magnetization appears in the first layer. This condition corresponds to Condition $4_H$.

When the medium temperature is further decreased slightly below $T_{C1}$, magnetization appears in the first layer. At this time, the exchange coupling force from the second layer acts to respectively align RE spins ( ↑ ) and TM spins ( ↓ ). As a result, magnetization ↑↓ , i.e., ↕ overcomes ↓ Hb, and appears in the first layer. This condition corresponds to Condition $5_H$.

The medium temperature is then decreased from the temperature in Condition $5_H$ to the room temperature. Since $H_{C1}$ at the room temperature is sufficiently large, the magnetization of the first layer is stably maintained. Thus, a bit in the "A direction" ↕ is formed.

The principle of the over-write operation will be described in detail below using a medium No. 7 belonging to a recording medium of Class 7 (P type, Quadrant III, Type 4) shown in Table 1.

This medium No. 7 has a relation given by Formula 41:

$$T_R < T_L < T_H \lesssim T_{C1} \lesssim T_{C2}$$

For the sake of simplicity, $T_H < T_{C1} < T_{C2}$ in the following description. FIG. 33 shows this relation.

A condition for reversing only the direction of magnetization of the second layer by the initial field Hini. without reversing that of the first layer at the room temperature $T_R$ is represented by Formula 42. This medium No. 7 satisfies Formula 42.

Formula 42:

$$H_{C1} > H_{C2} + \frac{\sigma_w}{2M_{S1}t_1} + \frac{\sigma_w}{2M_{S2}t_2}$$

A condition for Hini. at this time is given by Formula 45. When Hini. disappears, the directions of magnetization of the first and second layers influence each other due to the interface wall energy. Conditions for maintaining the directions of magnetization of the first and second layers without reversing them are represented by Formulas 43 and 44. This medium No. 7 satisfies Formulas 43 and 44.

Formula 43:

$$H_{C1} > \frac{\sigma_w}{2M_{S1}t_1}$$

-continued

Formula 44:

$$H_{C2} > \frac{\sigma_w}{2M_{S2}t_2}$$

The magnetization of the second layer of the recording medium which satisfies conditions given by Formulas 42 to 44 at the room temperature is aligned in, e.g., the "A direction" ↕ ( ↓ ↑ ) by Hini. which satisfies the condition given by Formula 45 immediately before recording:

Formula 45:

$$H_{C2} + \frac{\sigma_w}{2M_{S2}t_2} < |Hini.| < H_{C1} - \frac{\sigma_w}{2M_{S1}t_1}$$

At this time, the first layer is left in Condition $1_a$ or $1_b$ shown in FIG. 34.

The bias field Hb is assumed to be applied in the "non-A direction" ↓.

When the medium has a disk shape, a condition for inhibiting magnetization of a recorded bit (in particular, a bit in Condition $1_b$ in which the direction of magnetization of the first layer is opposite to the direction of Hb) from being reversed by Hb when it approaches an Hb apply means is represented by Formula 44-2:

$$Hb < H_{C1} + \frac{\sigma_w}{2M_{S1}t_1}$$

The disk medium must satisfy this formula at the room temperature. A condition for inhibiting the initialized second layer from being reversed by Hb when it approaches the Hb apply means is represented by Formula 45-3:

$$Hb < H_{C2} - \frac{\sigma_w}{2M_{S2}t_2}$$

In other words, conditions for determining Hb are Formulas 45-2 and 45-3.

A low-temperature cycle will be described below with reference to FIG. 34.

A low-level laser beam is radiated, and the medium temperature is increased to $T_L$. Thus, the following condition is satisfied:

$$H_{c1} + Hb < \frac{\sigma_w}{2M_{s1}t_1}$$

Thus, Condition $1_a$ transitions to Condition $2_L$. Meanwhile, Condition $1_b$ is maintained, and becomes Condition $2_r$.

When the bit falls outside the spot region of the laser beam in condition $2_L$, the medium temperature begins to be decreased. Since $H_{c1}$ is sufficiently large at the room temperature (see Formula 45-2, Condition $2_L$ can be maintained at the room temperature.

As a result, a bit in the "A direction" ↕ is formed in the first layer.

A high-temperature cycle will be described below with reference to FIG. 35.

A high-level laser beam is radiated, and the medium temperature is increased to the low temperature $T_L$. As a result, Condition $2_H$ equal to Condition $2_L$ is established.

The temperature thereafter reaches $T_H$. Since $T_H$ approaches the Curie temperatures of the first and second layers, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \quad (1)$$

$$\text{and } Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

$$\text{and } Hb > H_{C2} - \frac{\sigma_w}{2M_{S2}t_2}$$

$$Hb > H_{C1} - \frac{\sigma_w}{2M_{S1}t_1} \quad (3)$$

$$\text{and } Hb > H_{C2} + \frac{\sigma_w}{2M_{S2}t_2}$$

For this reason, the directions of magnetization of the two layers are almost simultaneously reversed to follow the direction of ↓ Hb. This condition corresponds to Condition $3_H$.

When the bit falls outside the spot region of the laser beam in Condition $3_H$, the medium temperature begins to be decreased.

The medium temperature is then returned to the room temperature. However, Condition $3_H$ is left unchanged.

As a result, a bit in the "non-A direction" ↕ is formed in the first layer.

The principle of the over-write operation will be described in detail below using a medium No. 8 belonging to a recording medium of Class 8 (A type, Quadrant IV, Type 2) shown in Table 1.

This medium No. 8 has a relation given by Formula 46:

$$R_R < T_L < T_H \lesssim T_{C1} \lesssim T_{C2}$$

For the sake of simplicity, $T_H < T_{C1} < T_{C2}$ in the following description. $T_{comp.2}$ may be lower than, or equal to, or higher than $T_L$ or $T_{C1}$. However, for the sake of simplicity, $T_L < T_{comp.2} < T_{C1}$ in the following description. FIG. 36 shows this relation.

A condition for reversing only the direction of magnetization of the second layer by the initial field room temperature $T_R$ is represented by Formula 47. This medium No. 8 satisfies Formula 47 at the room temperature.

Formula 47:

$$H_{C1} > H_{C2} + \left| \frac{\sigma_w}{2M_{S1}t_1} - \frac{\sigma_w}{2M_{S2}t_2} \right|$$

A condition for Hini. at this time is given by Formula 50. When Hini. disappears, the directions of magnetization of the first and second layers influence each other due to the interface wall energy. Conditions for maintaining the directions of magnetization of the first and second layers without reversing them are represented by Formulas 48 and 49. This medium No. 8 satisfies Formulas 48 and 49.

Formula 48:

$$H_{C1} > \frac{\sigma_w}{2M_{S1}t_1}$$

Formula 49:

$$H_{C2} > \frac{\sigma_w}{2M_{S2}t_2}$$

The magnetization of the second layer of the recording medium which satisfies Formulas 47 to 49 at the room temperature is aligned in, e.g., the "A direction" ⇑ ( ↑↓ ) by Hini. which satisfies the condition given by Formula 50 immediately before recording:

Formula 50:

$$H_{C2} + \frac{\sigma_w}{2M_{S2}t_2} < |H_{ini.}| < H_{C1} + \frac{\sigma_w}{2M_{S1}t_1}$$

At this time, the first layer is left in the recorded state, as shown in Condition $1_a$ or $1_b$ in FIG. 37.

The bias field Hb is assumed to be applied in the "A direction" ↑.

When the medium has a disk shape, a condition for inhibiting magnetization of a bit recorded just one revolution before (in particular, a bit in Condition 1b in which the direction of magnetization of the first layer is opposite to the direction of Hb) from being reversed by Hb is represented by Formula 50-2:

Formula 50-2:

$$Hb < H_{C1} + \frac{\sigma_w}{2M_{S1}t_1}$$

The disk medium must satisfy this formula at the room temperature. In other words, a condition for determining Hb is given by Formula 50-2.

A low-temperature cycle will be described below with reference to FIG. 37.

A low-level laser beam is radiated, and the medium temperature is increased to $T_L$. Thus, the following condition is satisfied:

$$H_{C1} + Hb < \frac{\sigma_w}{2M_{S1}t_1}$$

Thus, Condition 1a transitions to Condition $2_L$. Meanwhile, Condition 1b is maintained, and becomes Condition $2_L$.

When the bit falls outside the spot region of the laser beam in Condition $2_L$, the medium temperature begins to be decreased. Even when the medium temperature is decreased to the room temperature, Condition $2_L$ is maintained since $H_{C1}$ is sufficiently large (see Formula 50-2).

As a result, a bit in the "non-A direction" ⇓ is formed in the first layer.

A high-temperature cycle will be described below with reference to FIG. 38.

A high-level laser beam is radiated, and the medium temperature is increased to the low temperature $T_L$. As a result, Condition $2_H$ equal to Condition $2_L$ in the low-temperature cycle is established.

Under radiation of the high-level laser beam, the medium temperature is further increased. When the medium temperature exceeds $T_{comp.}2$, the medium type is shifted from A type to P type. The relationship between the strengths of RE spin ( ↑ ) and TM spin ( ↓ ) of the second layer is reversed (↑↓→↑↓) while their directions are left unchanged. As a result, the direction of magnetization of the second layer is reversed to the "non-A direction" ⇓. This condition corresponds to Condition $3_H$.

However, since $H_{C2}$ is still large at this temperature, the magnetization ⇓ the second layer will not be reversed by ↑ Hb.

The medium temperature is further increased up to $T_H$. Since the medium temperature is near the Curie temperatures of the first and second layers, the coercivities of the two layers are decreased. As a result, the medium satisfies one of following Formulas (1) to (3):

$$|H_{C1} - H_{C2}| < \frac{\sigma_w}{2M_{S1}t_1} + \frac{\sigma_w}{2M_{S2}t_2} \quad (1)$$

$$\text{and } Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

$$\text{and } Hb > H_{C2} - \frac{\sigma_w}{2M_{S2}t_2}$$

$$Hb > H_{C1} - \frac{\sigma_w}{2M_{S1}t_1} \quad (3)$$

$$\text{and } Hb > H_{C2} + \frac{\sigma_w}{2M_{S2}t_2}$$

For this reason, the directions of magnetization of the two layers are almost simultaneously reversed to follow the direction of ↑ Hb. This condition corresponds to Condition $4_H$.

When the bit falls outside the spot region of the laser beam in Condition $4_H$, the medium temperature begins to be decreased. When the medium temperature is decreased below $T_{comp.}2$, the medium type is restored from P type to original A type. The relationship between the strengths of RE spin ( ↓ ) and TM spin ( ↑ ) is reversed (↓↑→↓↑) while their directions are left unchanged. As a result, the direction of magnetization of the second layer is reversed to the "non-A direction" ⇓. In this condition, since $H_{C2}$ has already been considerably large, the magnetization ⇓ of the second layer will not be reversed by ↑ Hb. This condition corresponds to Condition $5_H$.

The medium temperature is then decreased from the temperature in Condition $5_H$ to the room temperature. However, Condition $5_H$ is left unchanged.

In this manner, a bit in the "A direction" ⇓ is formed in the first layer.

The principle of the over-write operation will be described in detail below using a specific medium No. 9 belonging to a recording medium of Class 9 (A type, Quadrant IV, Type 4) shown in Table 1.

This medium No. 9 has a relation given by Formula 51:

$$T_R < T_{C1} \approx T_L < T_{C2} \approx T_H$$

This relation is shown in FIG. 39.

A condition for reversing only the direction of magnetization of the second layer by the initial field Hini. without reversing that of the first layer at the room temperature $T_R$ is represented by Formula 52. This medium No. 9 satisfies Formula 52.

Formula 52:
$$H_{C1} > H_{C2} + \left| \frac{\sigma_w}{2M_{S1}t_1} - \frac{\sigma_w}{2M_{S2}t_2} \right|$$

A condition for Hini. at this time is given by Formula 55. When Hini. disappears, the reversed magnetization of the second layer is influenced by that of the first layer due to the exchange coupling force. Conditions for holding the magnetization of the second layer without re-reversing it are given by Formulas 53 and 54. This medium No. 9 satisfies Formulas 53 and 54.

Formula 53:
$$H_{C1} > \frac{\sigma_w}{2M_{S1}t_1}$$

Formula 54:
$$H_{C2} > \frac{\sigma_w}{2M_{S2}t_2}$$

Formula 55:
$$H_{C2} + \frac{\sigma_w}{2M_{S2}t_2} < |H_{ini.}| < H_{C1} + \frac{\sigma_w}{2M_{S1}t_1}$$

The magnetization of the second layer of the recording medium which satisfies the conditions given by Formulas 52 to 54 at the room temperature is aligned in, e.g. the "A direction" ⓤ (↑↓) by Hini. which satisfies the condition given by Formula 55 immediately before recording. At this time, the first layer is in Condition 1 in FIG. 40.

In this case, the bias field (Hb) is applied in a direction of ↓.

A low-temperature cycle will be described below with reference to FIG. 40.

A low-level laser beam is radiated to increase the medium temperature to $T_L$. Since $T_L$ is almost equal to the Curie temperature $T_{C1}$ of the first layer, its magnetization disappears. In this condition, since $H_{C2}$ is sufficiently large, the magnetization ⓤ of the second layer will not be reversed by ↓ Hb. This condition corresponds to Condition $2_L$.

When the bit falls outside the spot region of the laser beam in Condition $2_L$, the medium temperature begins to be decreased. When the medium temperature is decreased slightly below $T_{C1}$, RE and TM spins (↑↓) of the second layer influence those of the first layer due to the exchange coupling force. The exchange coupling force acts to respectively align the RE spins (↑) and TM spins (↓). As a result, magnetization ↑↓, i.e. ⓤ appears in the first layer. This condition corresponds to Condition $3_L$.

Condition $3_L$ is maintained even when the medium temperature is decreased to the room temperature. As a result, a bit in the "non-A direction" ⓤ is formed.

A high-temperature cycle will be described below with reference to FIG. 41.

When a high-level laser beam is radiated and increases the medium temperature to $T_L$, since $T_L$ is almost equal to the Curie temperature $T_{C1}$ of the first layer, its magnetization disappears, and Condition $2_H$ is established.

When the medium temperature is further increased up to $T_H$, since the temperature $T_H$ of the second layer is almost equal to $T_{C2}$, magnetization of the second layer also disappears. This condition corresponds to Condition $3_H$.

When the bit falls outside the spot region of the laser beam in Condition $3_H$, the medium temperature begins to be decreased. When the medium temperature is decreased slightly below $T_{C2}$, magnetization appears in the second layer. In this case, magnetization ⓤ (↓↑) appears due to ↓ Hb. However, since the temperature is higher than $T_{C1}$, no magnetization appears in the first layer. This condition corresponds to Condition $4_H$.

When the medium temperature is further decreased slightly below $T_{C1}$, magnetization appears in the first layer. At this time, the exchange coupling force from the second layer (↓↑) acts to respectively align RE spins (↓) and TM spins (↑). As a result, magnetization ↓↑, i.e., ⓤ overcomes ↓ Hb, and appears in the first layer. This condition corresponds to Condition $5_H$.

The medium temperature is then decreased from the temperature in Condition $5_H$ to the room temperature. Since $H_{C1}$ at the room temperature is sufficiently large, the magnetization of the first layer is stably maintained. Thus, a bit in the "A direction" ⓤ is formed.

BRIEF DESCRIPTION OF DRAWINGS

FIGS. 3 and 4 are charts showing output waveforms of a laser beam when information is recorded on the magnetooptical recording medium.

BEST MODE FOR CARRYING OUT THE INVENTION

The present invention will be described in detail below in connection with preferred embodiments thereof utilizing a Class 8 medium. However, the present invention is not limited to these.

Manufacture of Class 8 Medium (1) First, a disk-like glass substrate (S) having a thickness of 1.2 mm, and a diameter of 130 mm is prepared, and a grooved layer (U) having a thickness of about 100 $\mu$m is formed thereon. The grooved layer (U) is formed of an ultraviolet-curing resin, and a spiral groove for forming a separation zone of the present invention is formed on the layer. The groove has a depth of 700 Å, and a width of 0.4 $\mu$m, as shown in FIG. 42B.

(2) An RF magnetron-sputtering apparatus is used, and the glass substrate (S) with the grooved layer is set in a vacuum chamber.

After the interior of the vacuum chamber is temporarily evacuated to $5 \times 10^{-5}$ Pa., argon gas is introduced, and sputtering is performed while maintaining an Ar gas pressure to be $2 \times 10^{-1}$ Pa.

Figure 1:
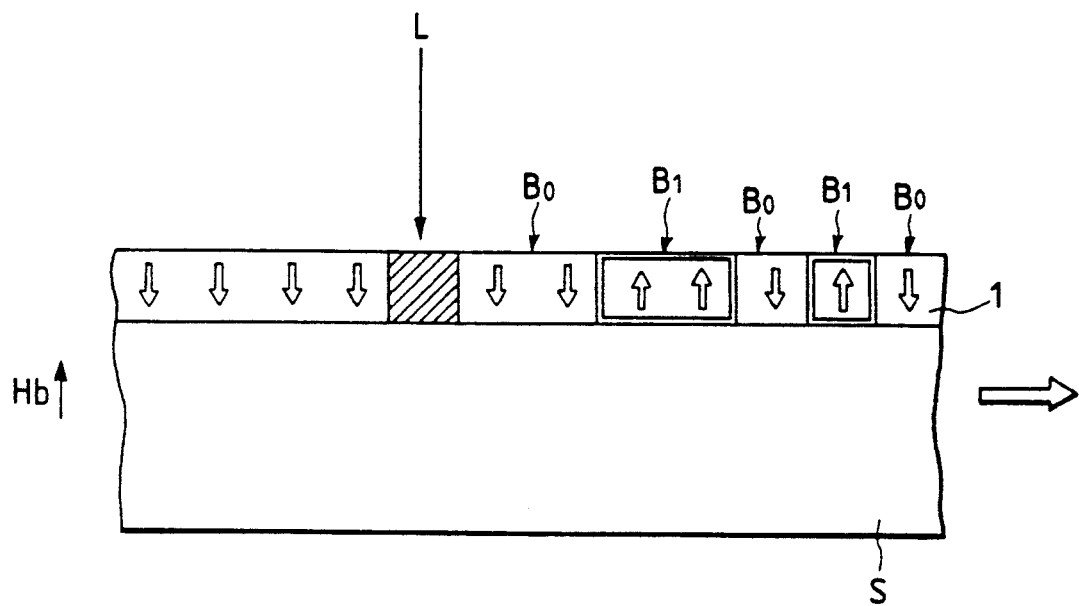
FIG. 1 is a view for explaining bit formation of a magnetooptical recording medium.
Figure 2:
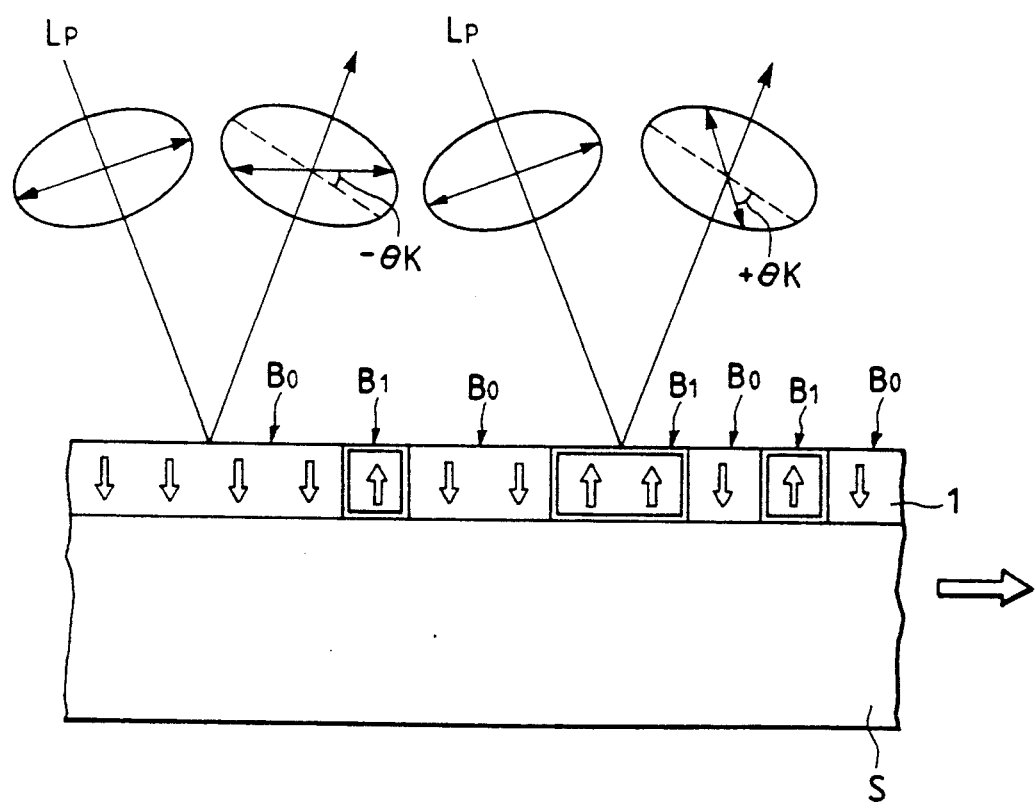
FIG. 2 is a view for explaining reproduction of information of the magnetooptical recording medium.
Figures 5, 6, 7:
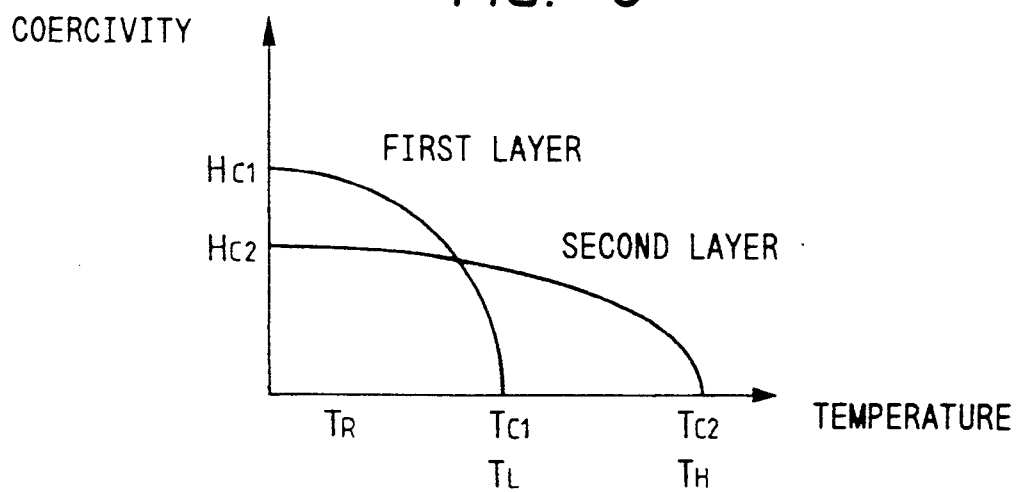
FIG. 5 is a view showing a structure of the magnetooptical recording medium.
FIG. 6 is a graph showing the relationship between coercivity and temperature of a magnetooptical recording medium according to the first category of the present invention.
FIG. 7 is a schematic view of the magnetooptical recording medium shown in FIG. 5.
Figure 8:
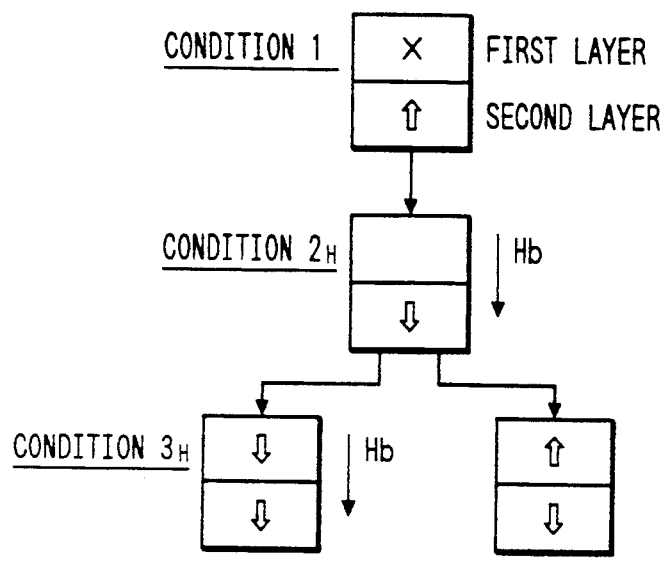
FIG. 8 is a diagram showing a change in magnetization when a high-level laser beam is radiated on the magnetooptical recording medium shown in FIG. 7 to record information.
Figure 9:
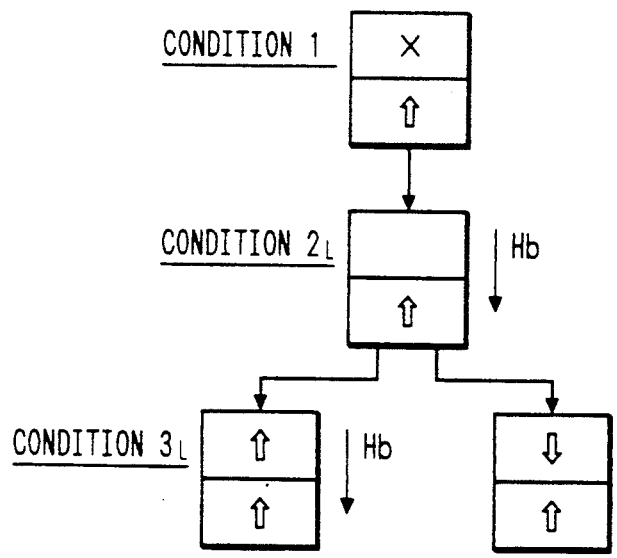
FIG. 9 is a diagram showing a change in magnetization when a low-level laser beam is radiated on the magnetooptical recording medium shown in FIG. 7 to record information.
Figure 10:
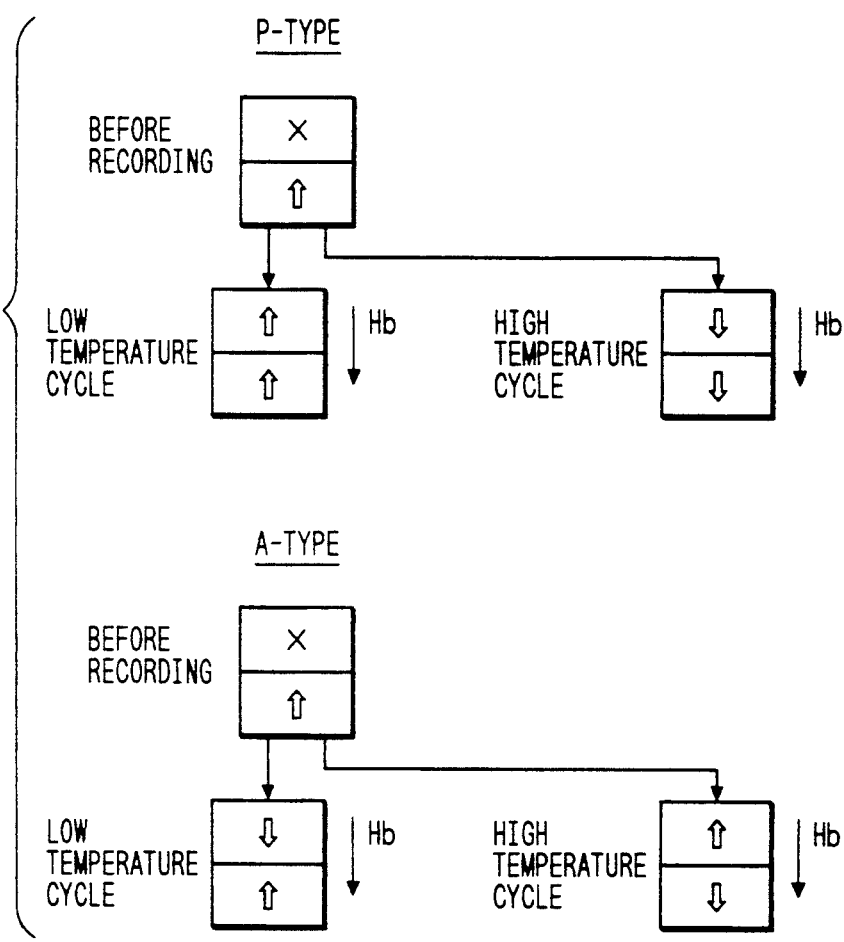
FIG. 10 is a diagram for explaining an over-write operation of the magnetooptical recording medium according to the present invention.
Figure 11:
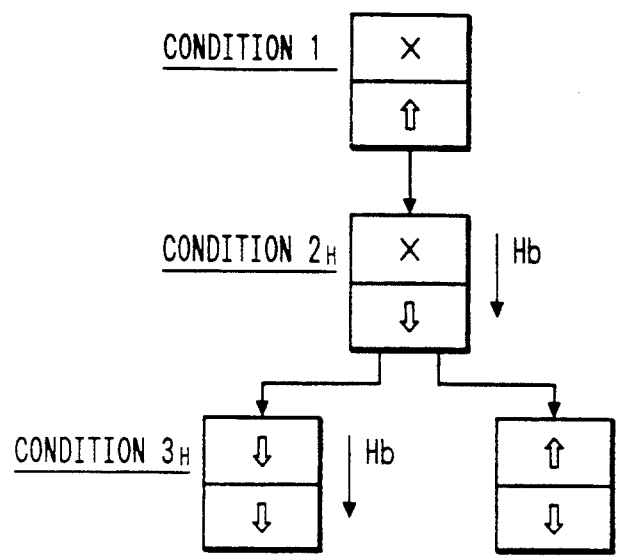
FIG. 11 is a diagram showing a change in magnetization when a high-level laser beam is radiated on a magnetooptical recording medium according to the second category of the present invention.
Figure 12:
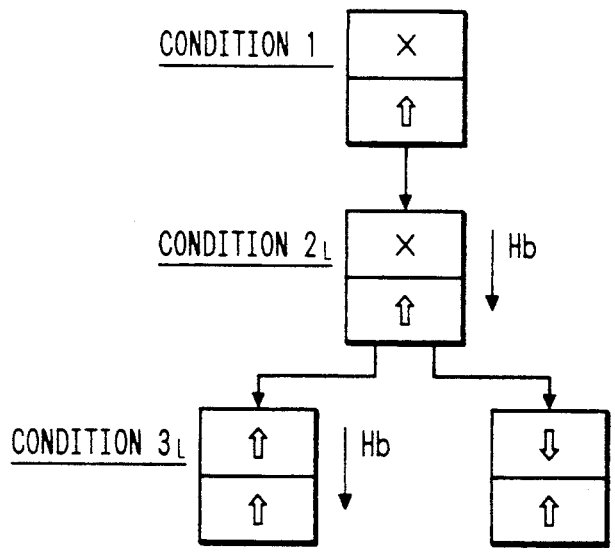
FIG. 12 is a diagram showing a change in magnetization when a low-level laser beam is radiated on the magnetooptical recording medium according to the second category of the present invention.
Figure 13:
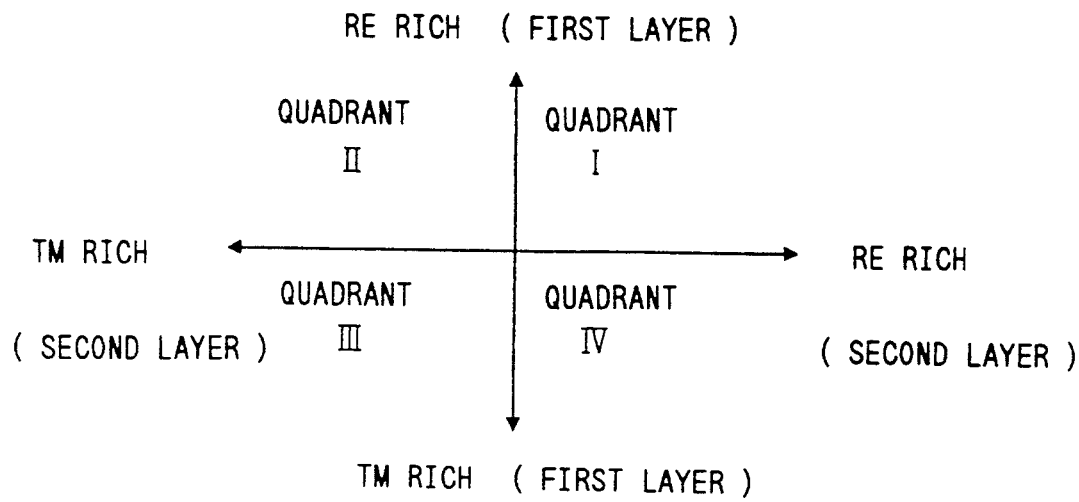
FIG. 13 and FIGS. 14A, 14B, 14C, and 14D are views showing characteristics of different types of magnetooptical recording media according to the present invention.
Figure 14A:
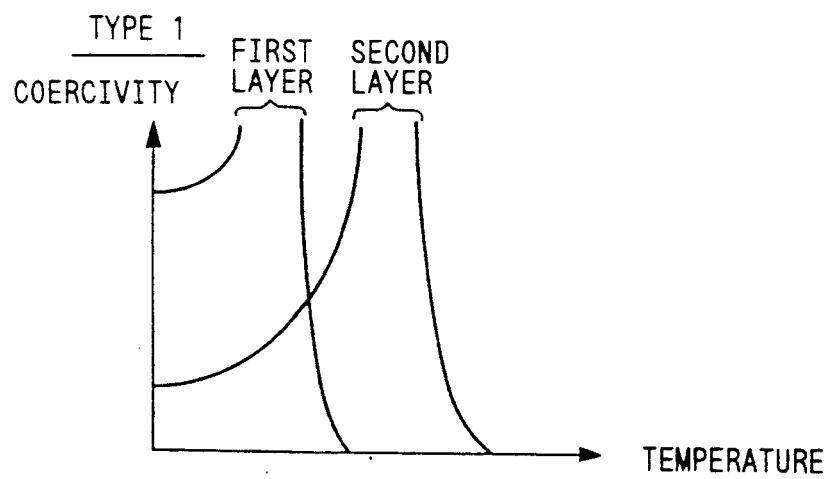
Figure 14B:
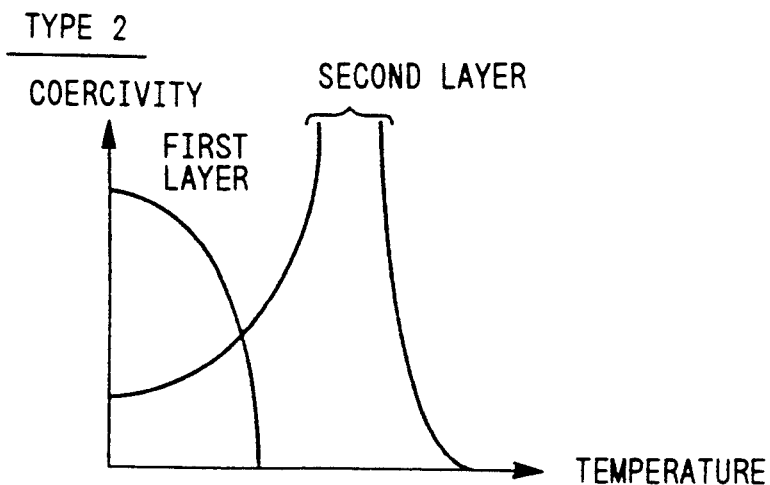
Figure 14C:
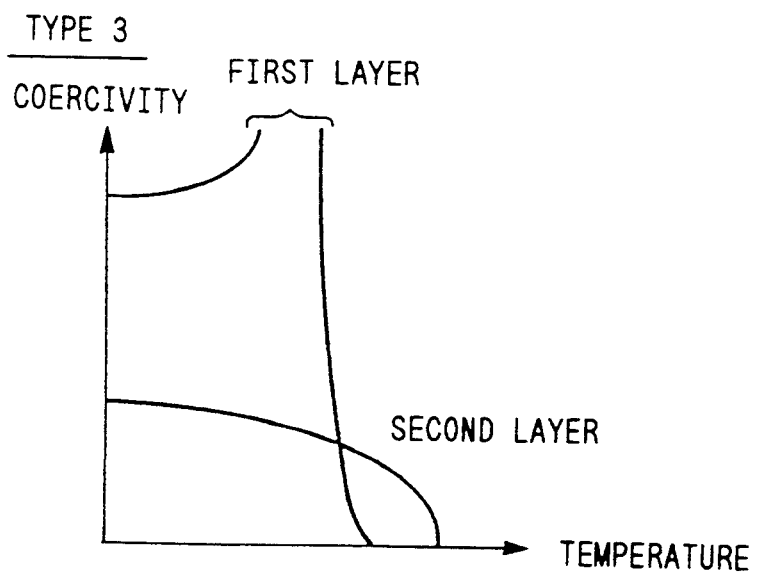
Figure 14D:
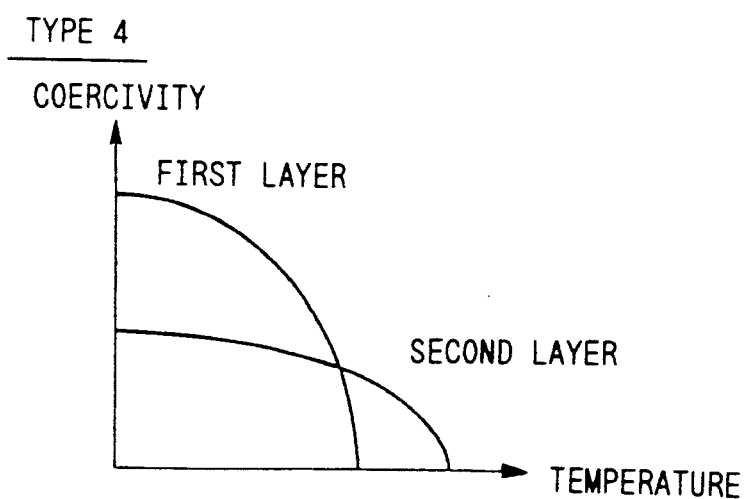
Figure 15:
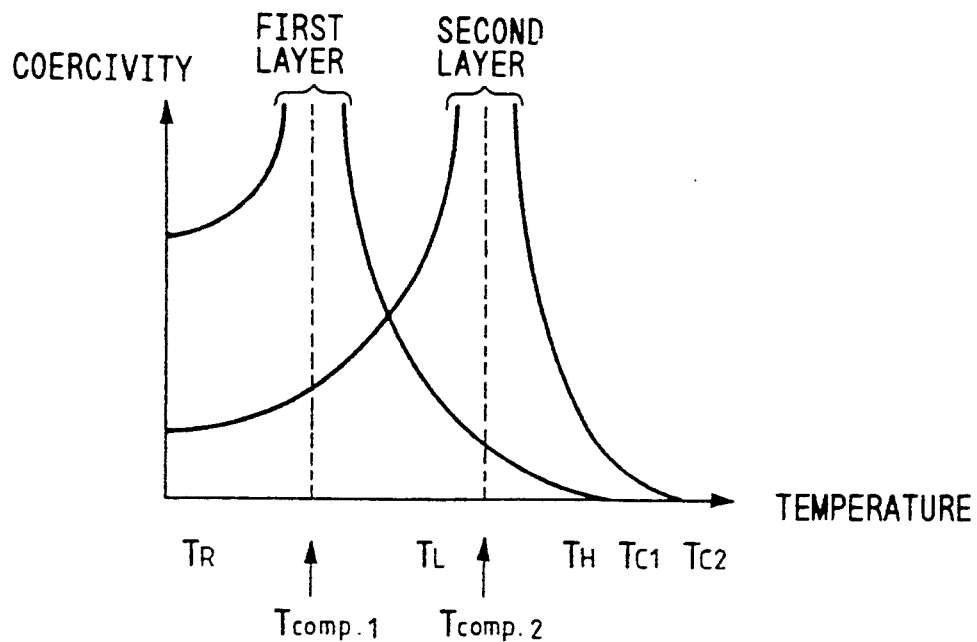
FIGS. 15, 18, 21, 24, 27, 30, 33, 36, and 39 are graphs showing the relationships between coercivities and temperatures of magnetooptical recording media according to the present invention.
Figure 16:
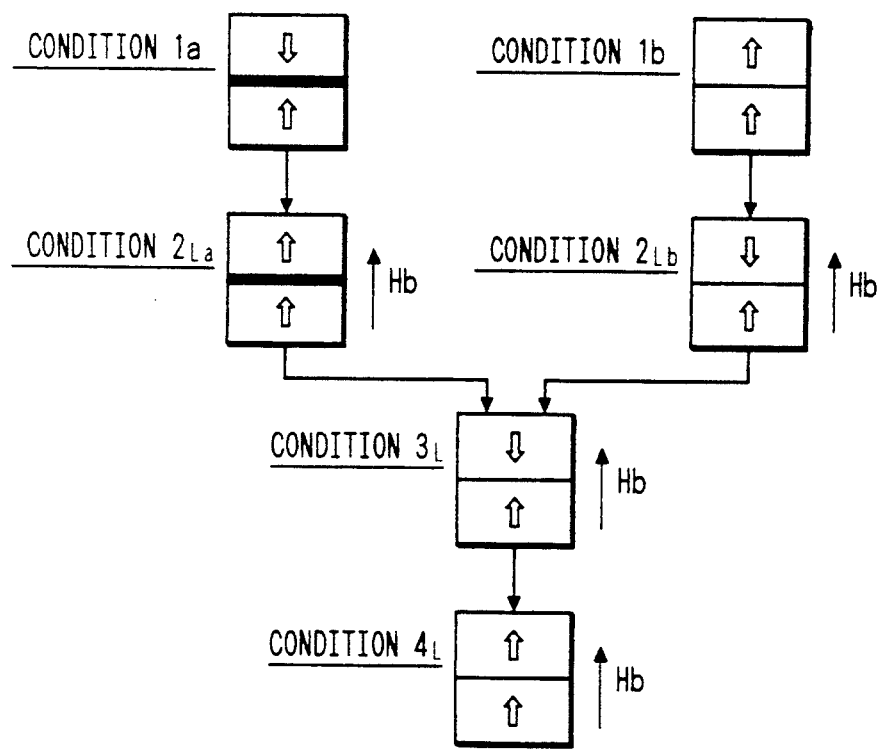
FIGS. 16, 19, 22, 25, 28, 31, 34, 37, and 40 are diagrams showing low-temperature cycles of the magnetooptical recording media according to the present invention.
Figure 17:
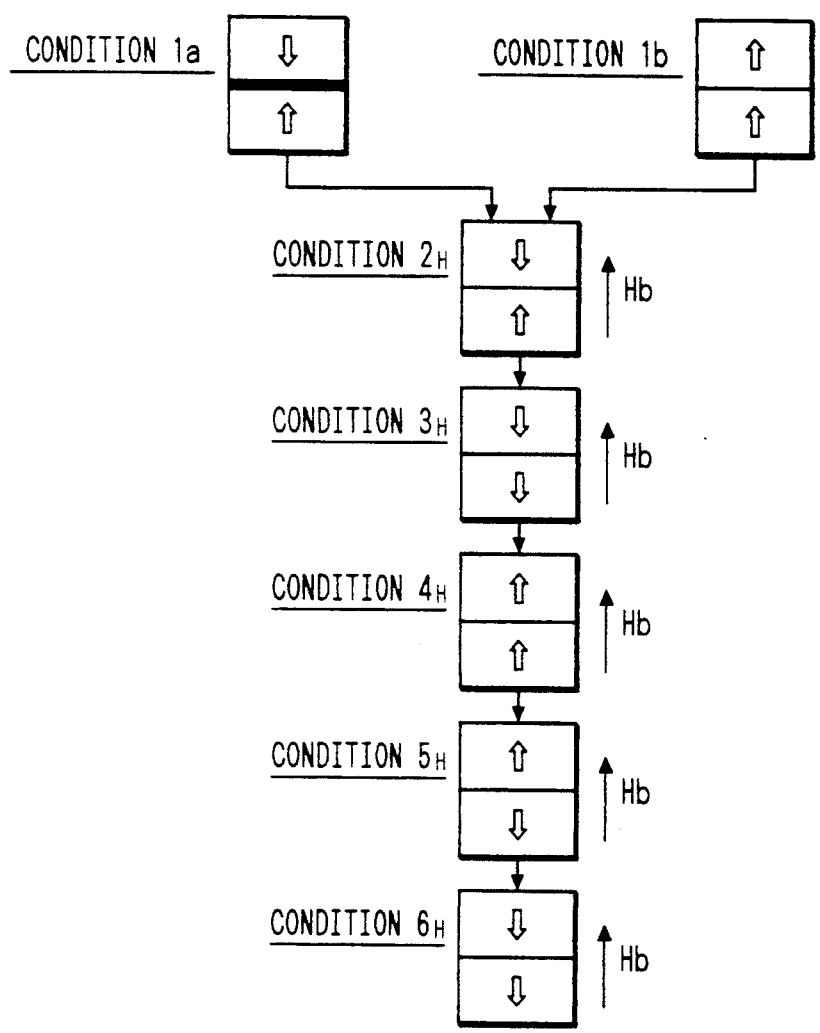
FIGS. 17, 20, 23, 26, 29, 32, 35, 38, and 41 are diagrams showing high-temperature cycles of the magnetooptical recording media according to the present invention.
Figure 18:
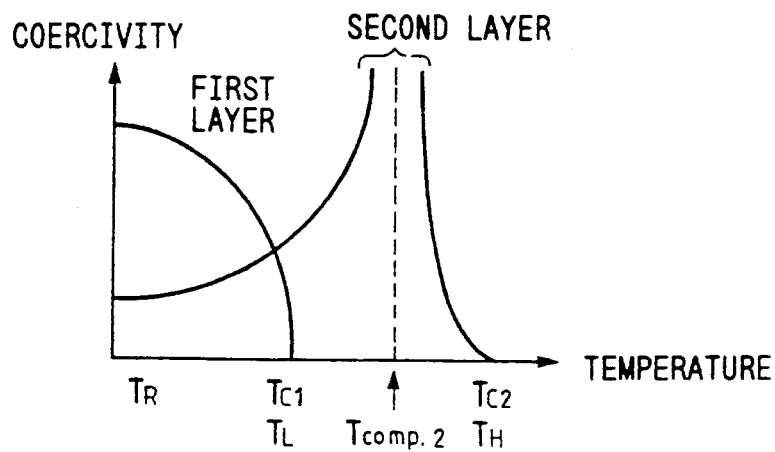
Figure 19:
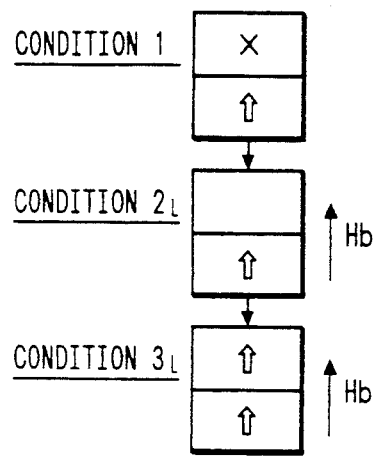
Figure 20:
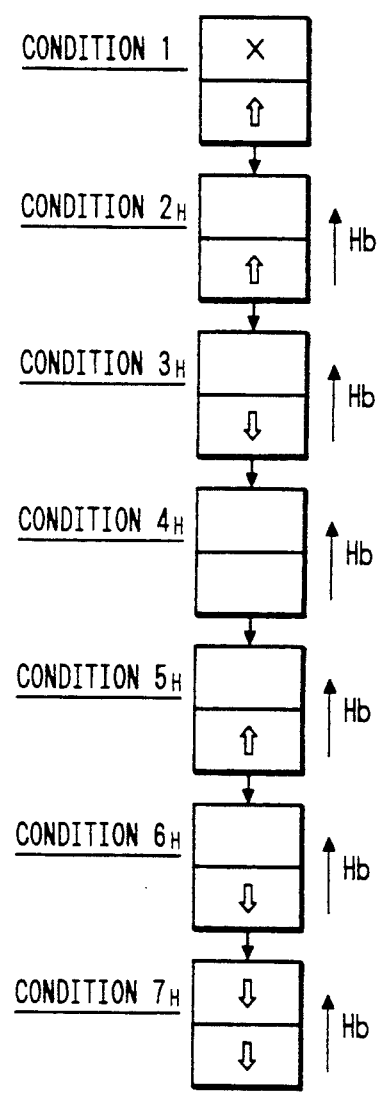
Figure 21:
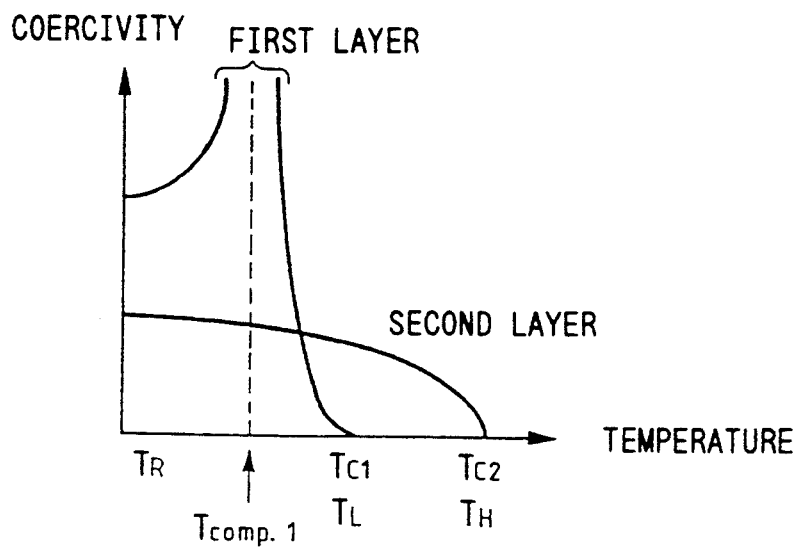
Figure 22:
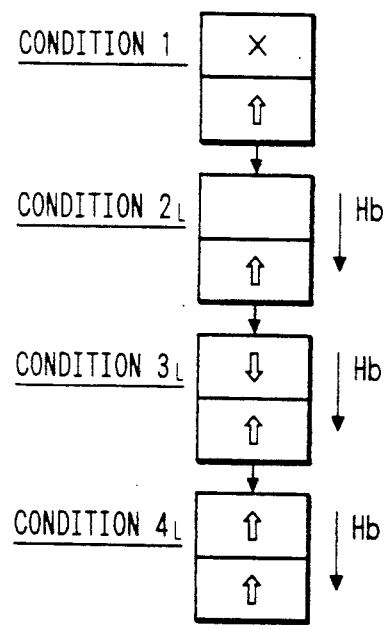
Figure 23:
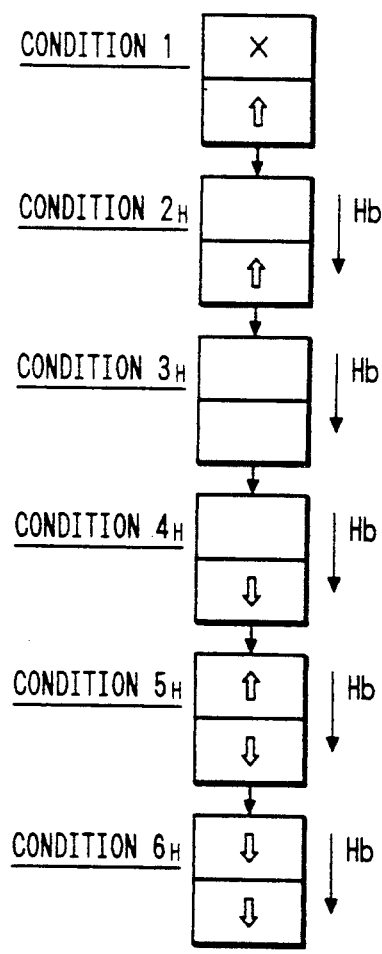
Figure 24:
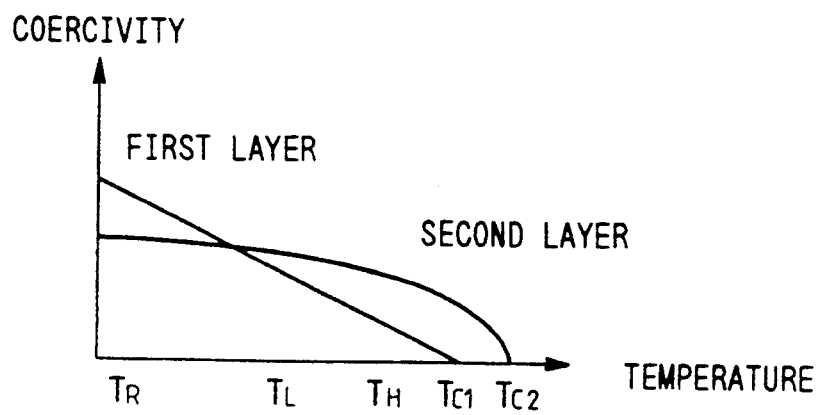
Figure 25:
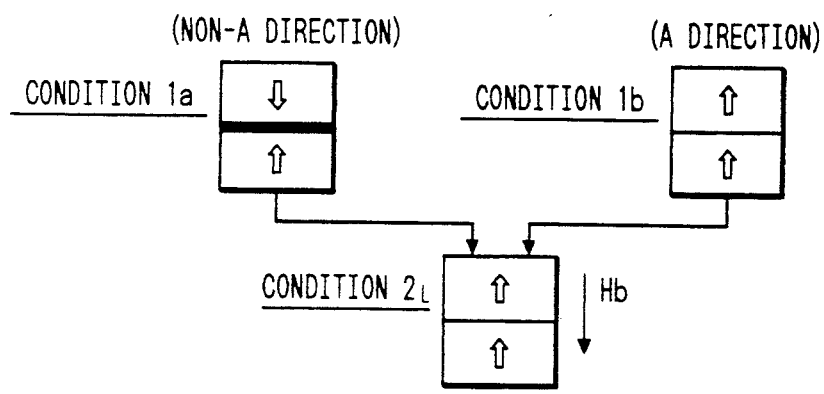
Figure 26:
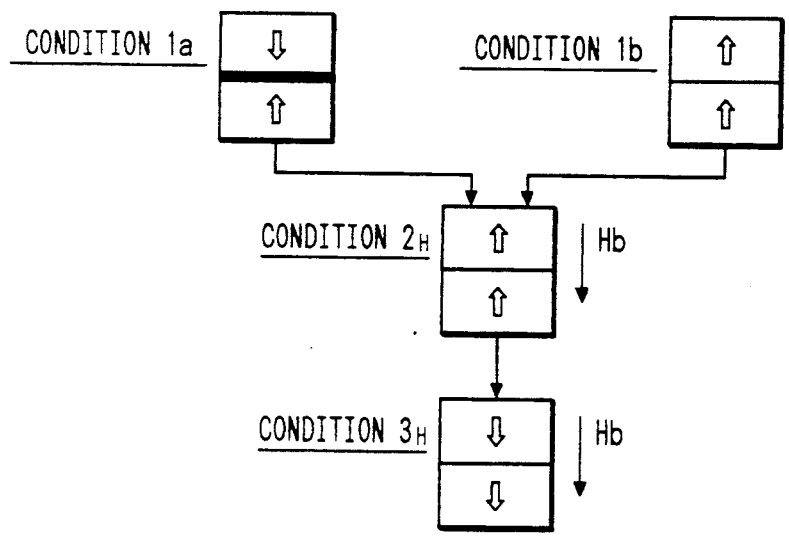
Figure 27:
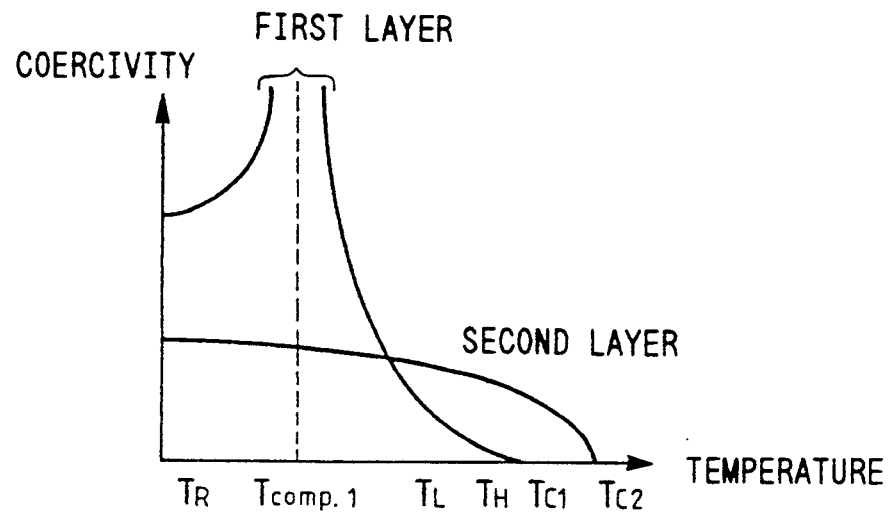
Figure 28:
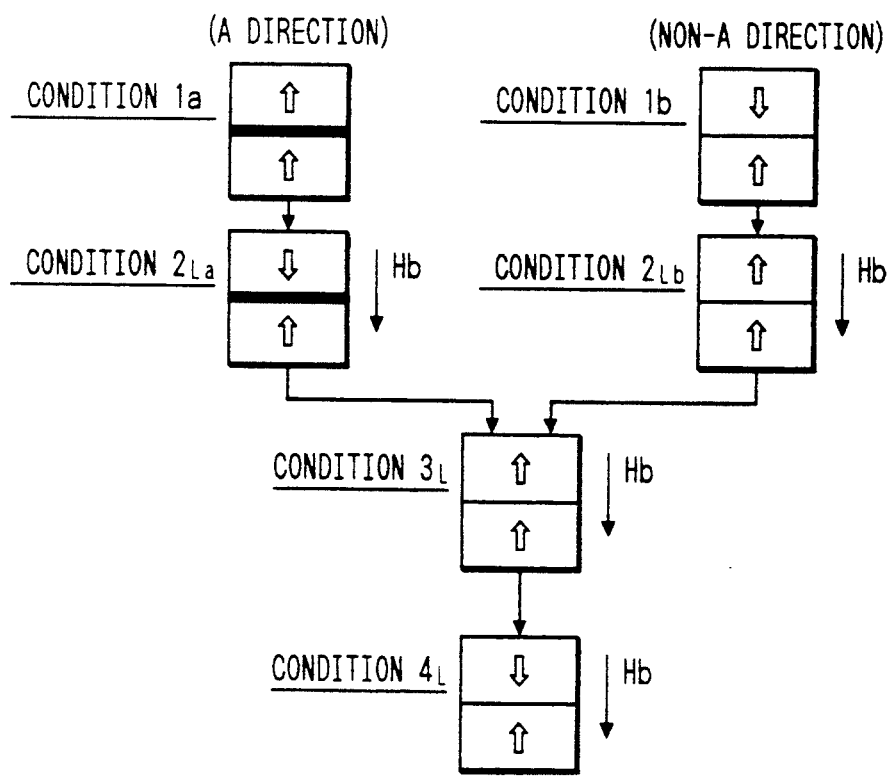
Figure 29:
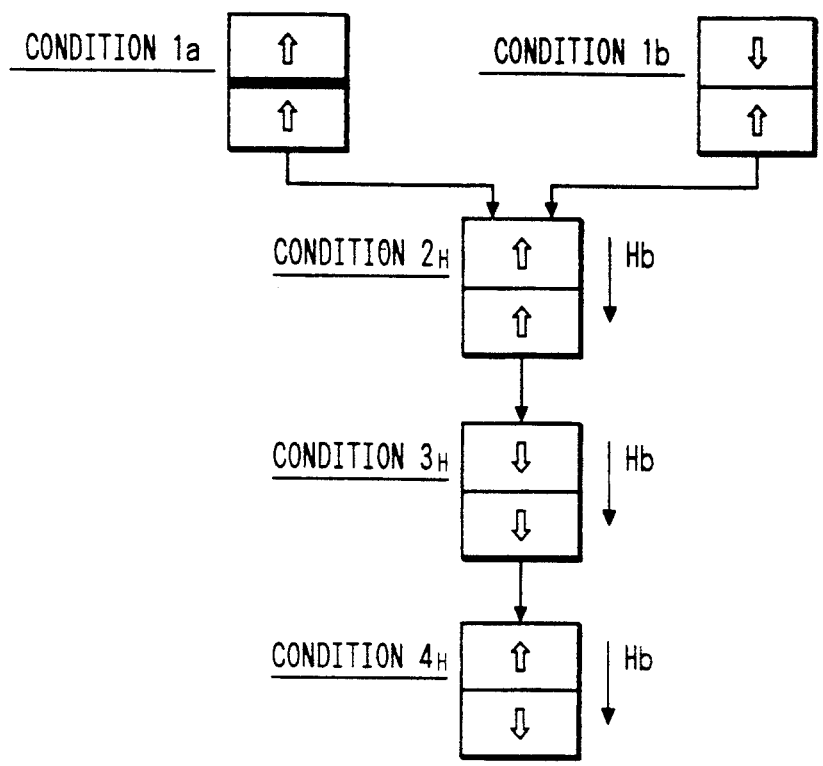
Figure 30:
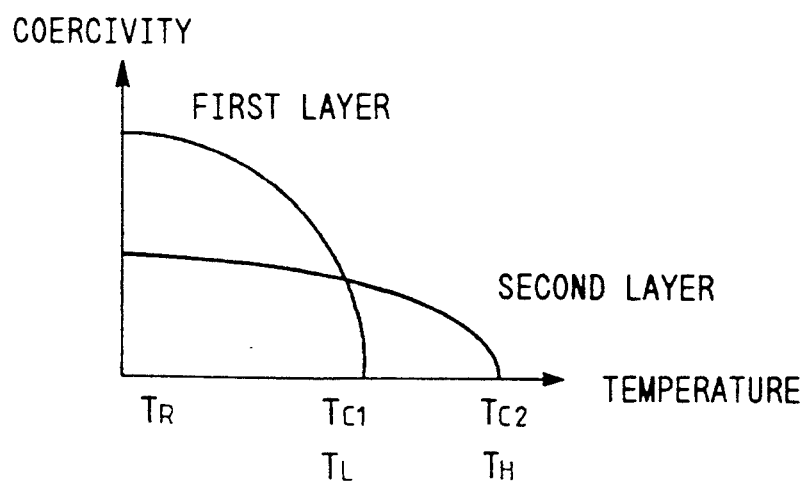
Figure 31:
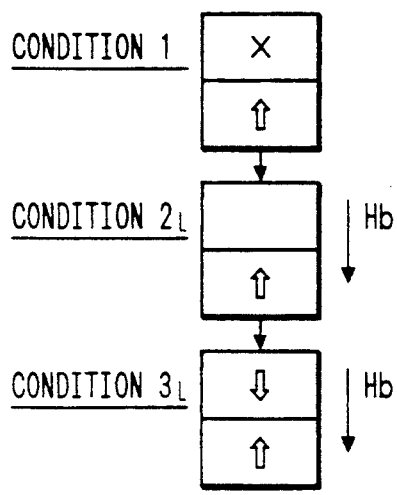
Figure 32:
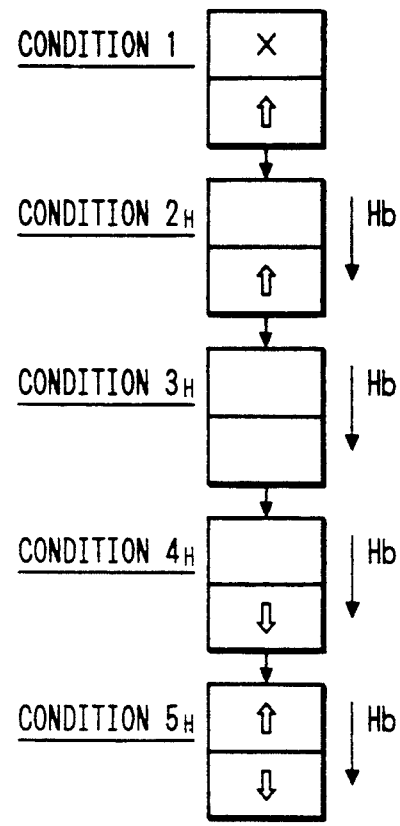
Figure 33:
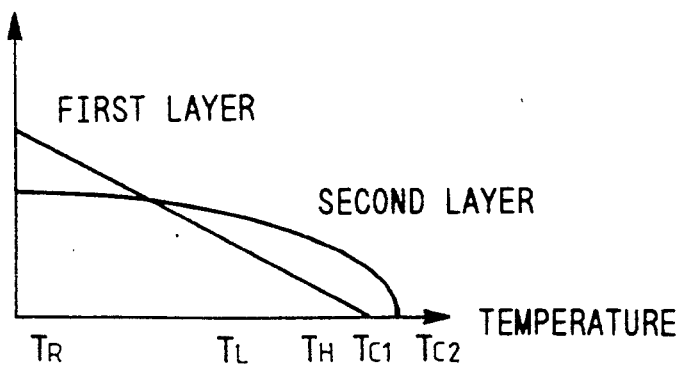
Figure 34:
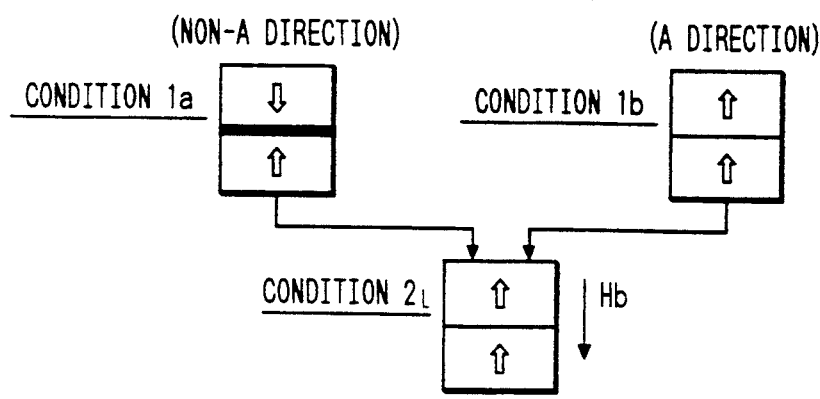
Figure 35:
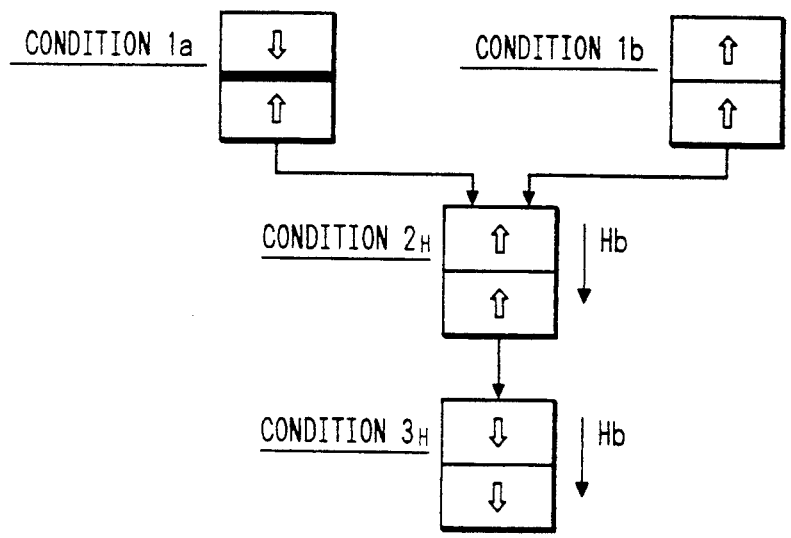
Figure 36:
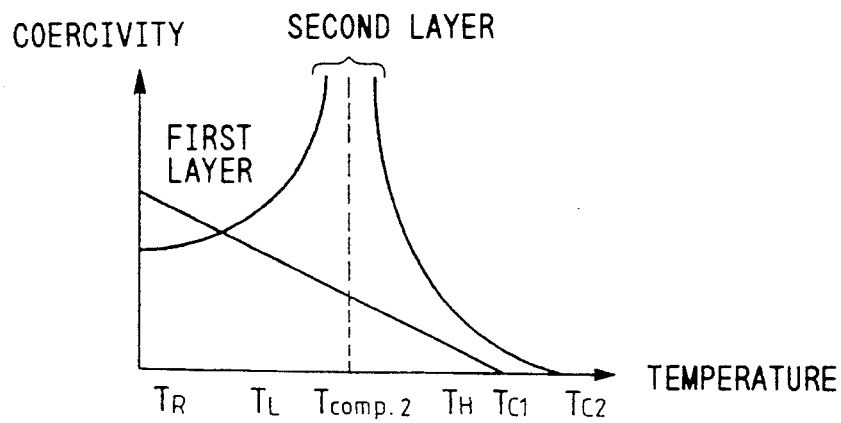
Figure 37:
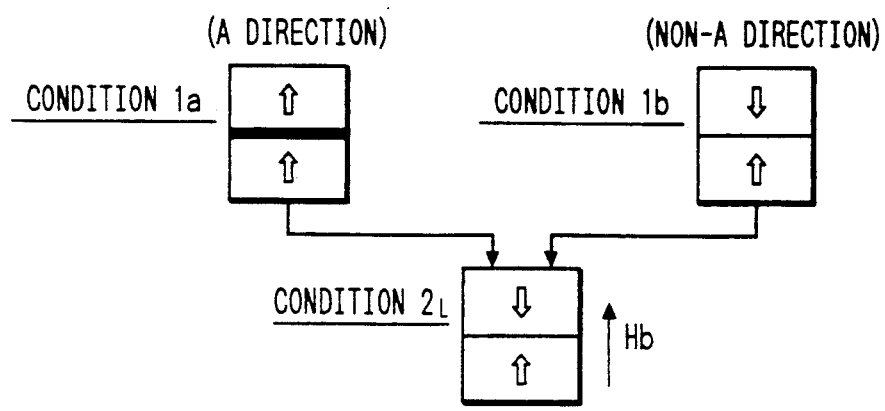
Figure 38:
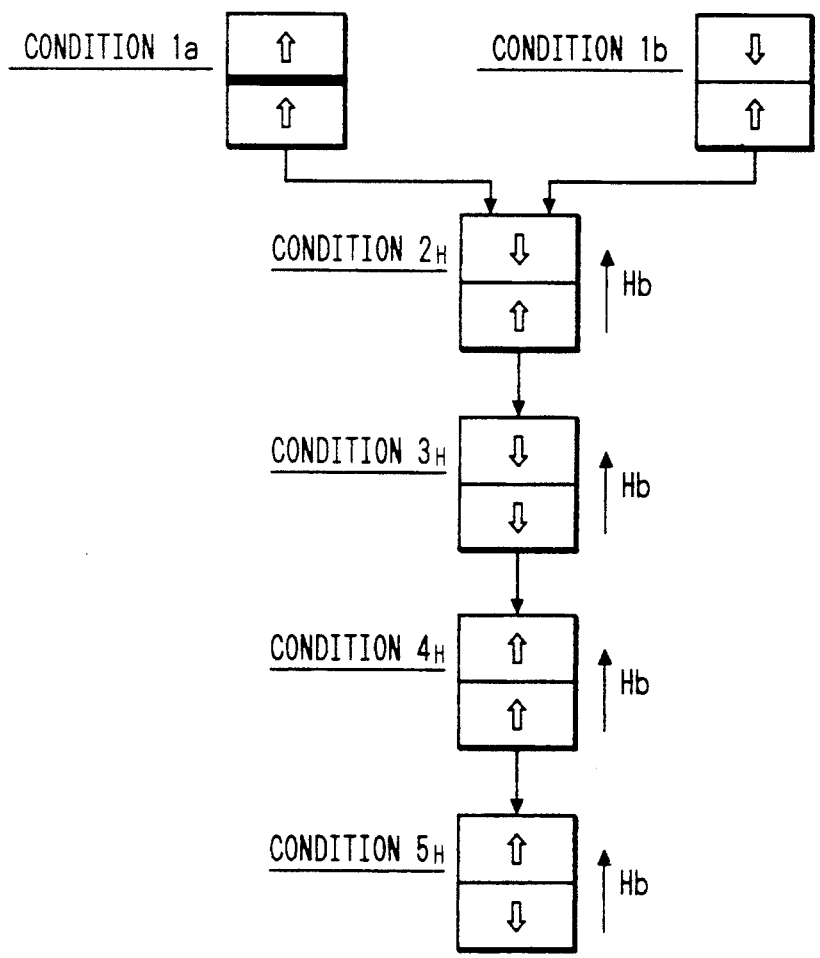
Figure 39:
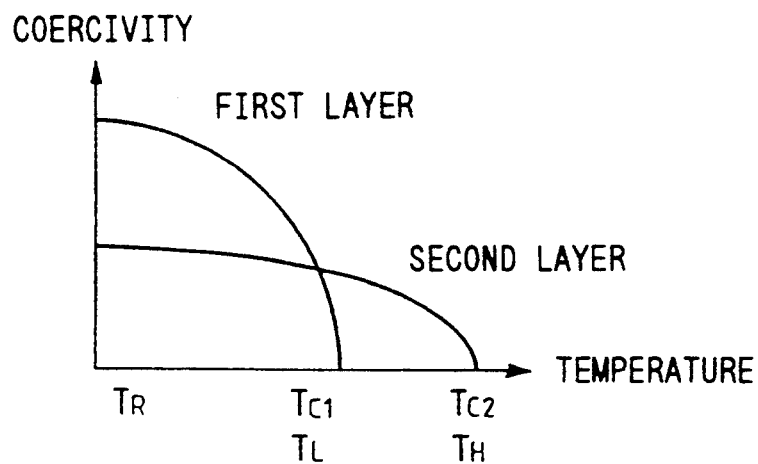
Figure 40:
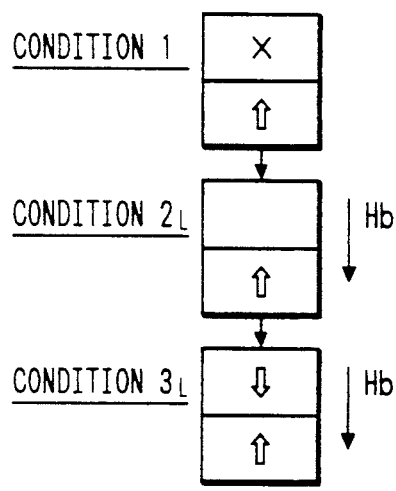
Figure 41:
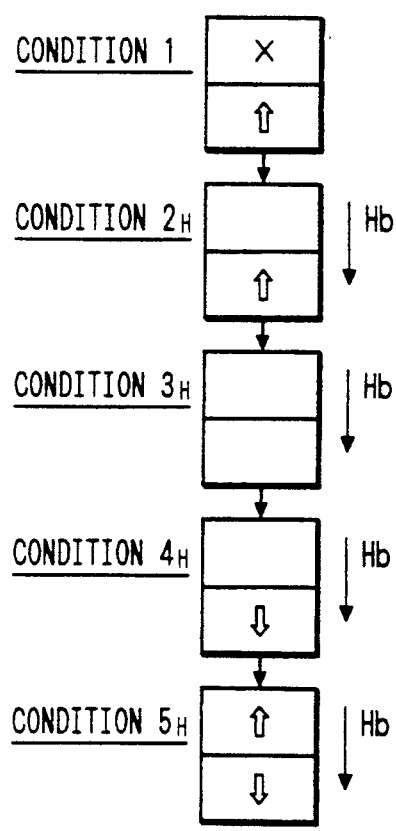
Figure 42A:
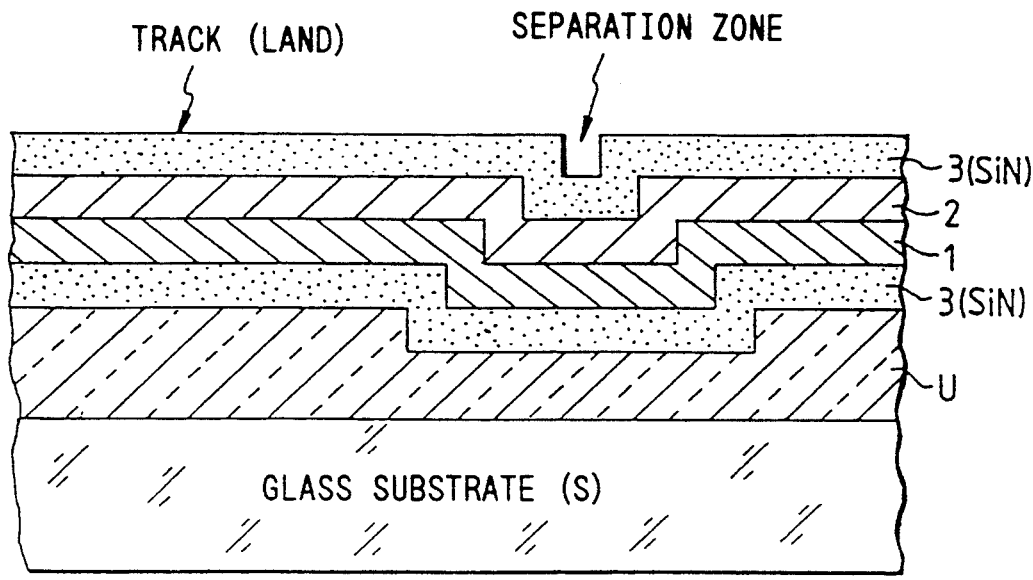
FIGS. 42A and 42B are sectional views for explaining an embodiment of the present invention.
Figure 42B:
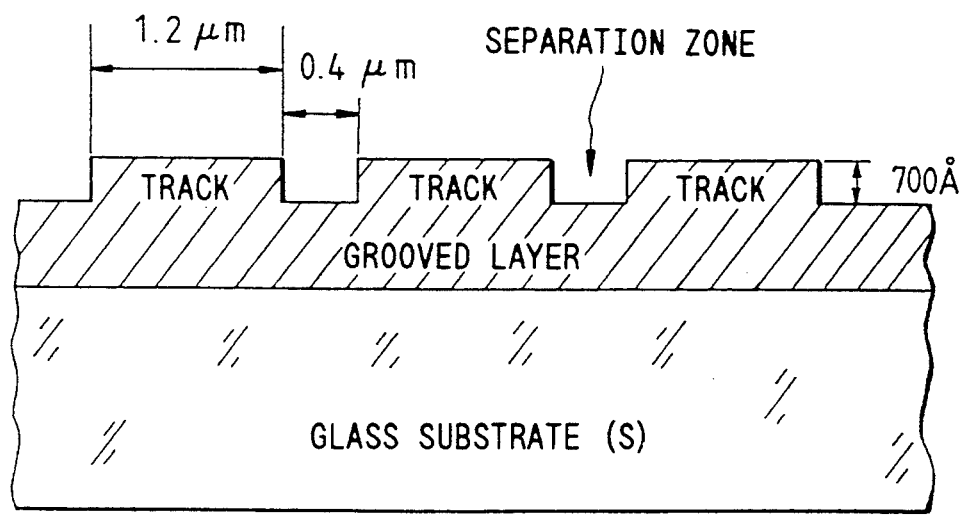

As shown in FIG. 42A, SiN is used as a first target, thus forming a 700-Å thick first protection layer 3 on the grooved layer. Subsequently, a $Tb_{20}Fe_{76}Co_4$ alloy is used as a target, thereby forming a first layer 1 (recording layer) comprising a $Tb_{20}Fe_{76}Co_4$ perpendicular magnetic anisotropy film having a film thickness $t_1 = 500$ Å. Note that the unit of suffixes in an alloy composition is atomic %. The same applies to the following description.

Sputtering is performed using a $Tb_9Dy_{18}Fe_{45}Co_{28}$ alloy as a target while maintaining a vacuum state, thereby forming a second layer 2 (reference layer) comprising a $Tb_9Dy_{18}Fe_{45}Co_{28}$ perpendicular magnetic anistotropy film having a film thickness $t_2 = 1,500$ Å.

Finally, a second 700-Å thick SiN protection layer 3 is formed on the second layer.

Table 2 below summarizes magnetic characteristics (25° C.) of two-layered magnetooptical recording media belonging to Class 8 (A type, Quadrant IV, Type 2) manufactured in this manner.

TABLE 2

|  | First Layer | Second Layer |
| --- | --- | --- |
| Composition | $Tb_{20}Fe_{76}Co_4$ | $Tb_9Dy_{18}Fe_{45}Co_{28}$ |
| Film Thickness t (Å) | 500 | 1,500 |
| Ms (emu/cc) | 35 | 120 |
| Hc (Oe) | 12,000 | 2,000 |
| Tc (°C.) | 180 | 280 |
| $T_{comp.}$ (°C.) | None | 120 |
| $\sigma_w$ (erg/cm$^2$) |  | 3.7 |

EXAMPLE 1

Figure 43:
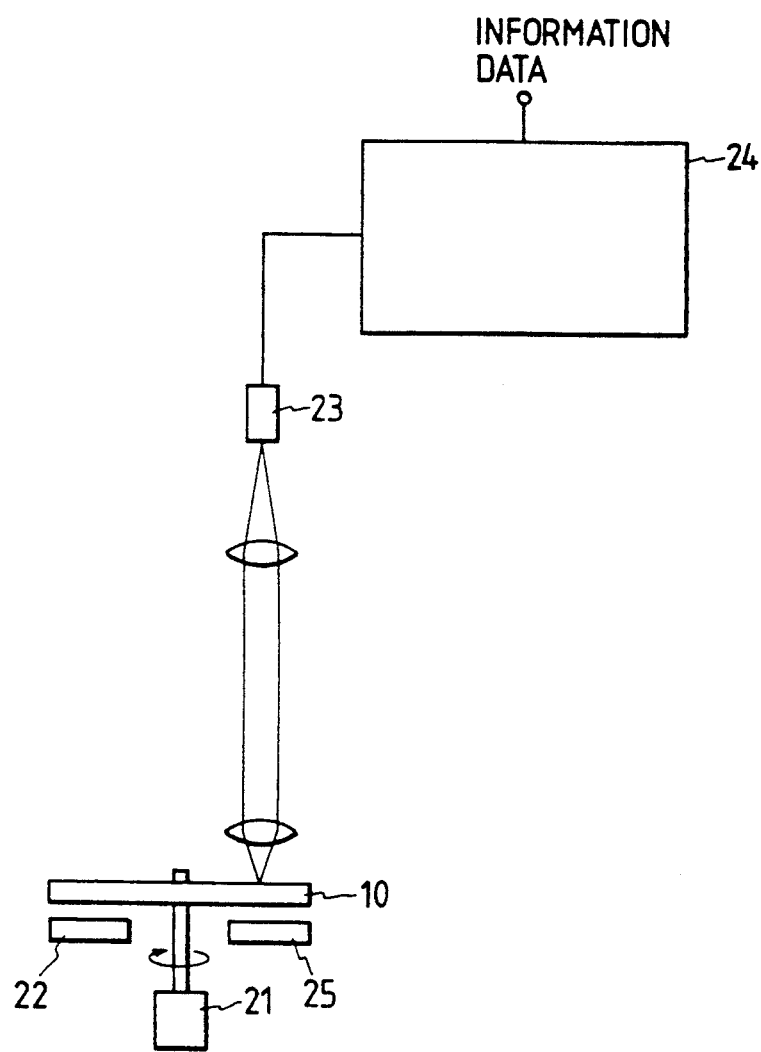
FIG. 43 is a diagram showing an apparatus according to the present invention.

FIG. 43 is a schematic view showing a structure of an over-write capable magnetooptical recording apparatus.

Reference numeral 20 denotes an over-write capable magnetooptical recording medium; 21, a rotating means for rotating the magnetooptical recording medium; 22, an initial field apply means (Hini. = 4,000 Oe and "non-A direction" ↓); 23, a laser beam source; 24, a modulation means for pulse-modulating a laser beam intensity between high level and low level according to information; and 25, a bias field apply means (Hb = 300 Oe, and "non-A direction" ↓).

For purposes of the invention, the initial field apply means was removed from the apparatus of FIG. 43, and a rod-like permanent magnet for generating a 1,000-Oe magnetic field in an "A direction" ↑ was mounted as a pre-processing field apply means in place of the bias field apply means.

A tracking mechanism of the recording apparatus was adjusted so that a laser beam could be radiated along a magnetic layer (multilayered structure of first and second layers) located in a groove. A recording medium (A type disk) manufactured as earlier described was then set in the foregoing apparatus and rotated at 1,800 rpm.

In this case, the laser beam intensity was set to be constant, i.e., 10 mW on the surface of the magnetic layer, and was not modulated.

In this manner, pre-processing was completed, and the direction of magnetization of the first layer in the groove was aligned in the "A direction" ↑. Since the first layer does not have a compensation temperature between a medium temperature when it is heated by the laser beam and a room temperature, the direction of the pre-processing field applied upon radiation of the laser beam is the same as the aligned direction of magnetization of the first layer at the room temperature.

Since the direction of Hini. is the "non-A direction" ↓, the direction of magnetization of the second layer located in the groove is also aligned in the "non-A direction" ↓. However, since this medium is of A type, when the first layer is aligned in the "A direction" ↑, no magnetic wall is formed between the first and second layer.

Figure 42C:
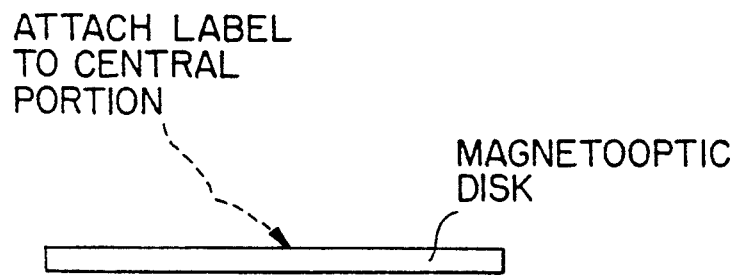
FIG. 42C is an additional explanatory view.

A label indicating that the direction of Hini. should be set in the "non-A direction" ↓ was adhered to the central portion of the medium processed in Example 1. See FIG. 42C.

Note that a different type of indication, such as a "mark" which can be detected by an electrical, magnetic, or mechanical sensor, may be used in place of the label. Also, an appropriate indication may be applied to a case containing the medium.

The medium of Example 2 was set in a recording apparatus as shown in FIG. 43. The medium was rotated at 1,800 rpm, and recording was performed on a track at a position corresponding to a radius r = 30 mm.

A laser beam intensity at high level was set to be 7.0 mW on the surface of the recording layer, and an intensity at low level was set to be 3.5 mW. Thus, when a high-level laser beam was radiated, the medium temperature was increased to a high temperature $T_H = 200°$ C., and a high-temperature process was executed, while when a low-level laser beam was radiated, the medium temperature was increased to a low temperature $T_L = 130°$ C., and a low-temperature process was executed.

A 1-MHz signal wave was used as information, and recording was performed on a track while modulating a laser beam at 1 MHz, and applying Hini. and Hb.

When recorded information was reproduced by another conventional magnetooptical recording/reproduction apparatus, a C/N ratio was 55 dB.

A 2-MHz signal wave was used as information, and recording (over-write) and reproduction were performed. As a result, no 1-MHz signal was observed at all, and a C/N ratio was 52 dB.

COMPARATIVE EXAMPLE

For the purpose of comparison, substantially the same processing as in Example 1 was performed, except that the pre-processing field was changed to the "non-A direction" ↓.

Recording/reproduction of this medium was performed in the same manner as explained above As a result, after the over-write operation, a C/N ratio (2-MHz signal) was 50 dB, and a previously recorded 1-MHz signal which remained after the over-write operation was observed. Thus, an erase rate of a 1-MHz signal was 40 dB.

As will be appreciated from the preceding description, according to the present invention, since processing is performed to eliminate a magnetic wall between first and second layers of a recording layer located in a separation zone, problems such as a decrease in C/N ratio, reproduction of previous information, and a high bit error rate can be solved.

I claim:

1. Method of pre-processing comprising:
   (a) a first step of providing a magnetooptical recording medium which is over-write capable by beam intensity modulation, the medium having an at least two-layered structure including a recording layer having a perpendicular magnetic anisotropy and a reference layer having a perpendicular magnetic anisotropy and exchange-coupled to the recording layer, and a direction of magnetization of the reference layer being alignable in a first predetermined direction without changing a direction of magnetization of the recording layer, the medium further having a plurality of tracks in which information is recordable and a separation zone formed between adjacent tracks; and
   (b) a second step of aligning a direction of magnetization of the recording layer in the separation zone in a second predetermined direction by application of a preprocessing field so as to prevent, when the direction of magnetization of said reference layer is aligned in said first direction, formation of a magnetic wall between the recording layer and the reference layer in the separation zone.

2. A method according to claim 1, wherein said medium is of parallel type (P type), and said first predetermined direction and said second predetermined direction are the same.

3. A method according to claim 1, wherein said medium is of anti-parallel type (A-type), and said first predetermined direction and said second predetermined direction are opposite.

4. A method according to claim 1, wherein said medium is heated during said second step.

5. A method according to claim 1, further comprising:
   (c) an additional step of applying to said medium an indication that the direction of magnetization of said recording layer in said separation zone is aligned in said second predetermined direction.

6. A method according to claim 1, further comprising:
   (c) an additional step of applying to a case containing said medium an indication that the direction of magnetization of said recording layer in said separation zone is aligned in said second predetermined direction.

7. A method according to claim 1, further comprising, after said second step:
   (c) an additional step of aligning the direction of magnetization of said reference layer in said first predetermined direction by application of an initial field.

8. A magnetooptical recording medium, comprising an at least two-layered structure over-write capable by beam intensity modulation and including a recording layer having a perpendicular magnetic anisotropy and a reference layer having a perpendicular magnetic anisotropy and exchange coupled to the recording layer, with a direction of magnetization of the reference layer being alignable in a first predetermined direction without changing a direction of magnetization of the recording layer, a plurality of tracks in which information is recordable, and a separation zone formed between adjacent tracks, the medium having been subjected to a pre-processing field, with or without heating, so as to align a direction of magnetization of the recording layer in the separation zone in a second predetermined direction such that, when the direction of magnetization of the reference layer is aligned in the first predetermined direction, a magnetic wall between the recording layer and the reference layer is not formed in the separation zone.

9. A medium according to claim 8, wherein an indication that the direction of magnetization of said recording layer in said separation zone is aligned in said second predetermined direction is applied to said medium itself or to a case containing said medium.

10. A medium according to claim 9, wherein said first predetermined direction and said second predetermined direction are the same.

11. A medium according to claim 9, wherein said first predetermined direction and said second predetermined direction are opposite.

* * * * *